United States Patent
Kelada

(10) Patent No.: US 10,981,115 B2
(45) Date of Patent: Apr. 20, 2021

(54) SYMBIOTIC REVERSE OSMOSIS FOR MAXIMIZING DESALINATED WATER RECOVERY FROM SALINE WATERS AND BRINES

(71) Applicant: Maher Isaac Kelada, Houston, TX (US)

(72) Inventor: Maher Isaac Kelada, Houston, TX (US)

(*) Notice: Subject to any disclaimer, the term of this patent is extended or adjusted under 35 U.S.C. 154(b) by 292 days.

(21) Appl. No.: 15/757,604

(22) PCT Filed: Sep. 19, 2016

(86) PCT No.: PCT/US2016/052489
§ 371 (c)(1),
(2) Date: Mar. 5, 2018

(87) PCT Pub. No.: WO2017/049293
PCT Pub. Date: Mar. 23, 2017

(65) Prior Publication Data
US 2018/0193800 A1    Jul. 12, 2018

Related U.S. Application Data

(63) Continuation of application No. 15/257,585, filed on Sep. 6, 2016, now abandoned.
(Continued)

(51) Int. Cl.
*B01D 61/06* (2006.01)
*B01D 61/02* (2006.01)
(Continued)

(52) U.S. Cl.
CPC .............. *B01D 61/06* (2013.01); *A23L 27/40* (2016.08); *B01D 61/022* (2013.01);
(Continued)

(58) Field of Classification Search
CPC .. B01D 61/002; B01D 61/06; B01D 2321/04; B01D 2321/2083; B01D 2313/246;
(Continued)

(56) References Cited

U.S. PATENT DOCUMENTS 4,434,057 A    2/1984 Marquardt
2006/0144787 A1    7/2006 Schmidt et al.
(Continued)

*Primary Examiner* — David C Mellon
(74) *Attorney, Agent, or Firm* — David Guerra

(57) ABSTRACT

The present application includes a symbiotic reverse osmosis train system for maximizing desalinated water recovery, meanwhile yielding high salinity brine suitable for osmotic power generation or commercial salt production. The trains comprise a series of cells operating in an interrelated sequential pattern within a salinity field. Each cell forms a closed hydraulic brine loop having pumping means, power recovery means and shared semipermeable membranes between adjacent cells. Used are a semipermeable Flat Sheet or Hollow Fiber Membrane in desalination and osmotic power generation of brackish, seawater and brines of 15% salinity or more. Charging each cell in the train of cells with a formulated brine having a specified ionizable inorganic salt concentration and type, without permitting mixing of the given brines among adjacent cells. Allowing the train to achieve water recovery exceeding 85% with concentrated rejected brine of 28-30% salt content.

17 Claims, 28 Drawing Sheets

Flat Sheet Membrane [FSM] equipment arrangement of seawater desalination recovery of 75%, in accordance with the scheme of FIG 10, comprising one (1) SWRO and three (3) SRO stages operating within the range of 3.5-14% salinity at Differential Salinity Concentration of 4%. Flow Reynolds Number of 3,000-3,500 for fouling mitigation to avoid membrane's stagnation zones.

Related U.S. Application Data

(60) Provisional application No. 62/220,885, filed on Sep. 18, 2015.

(51) Int. Cl.

| | | |
|---|---|---|
| *B01D 61/04* | (2006.01) | |
| *B01D 61/08* | (2006.01) | |
| *B01D 65/02* | (2006.01) | |
| *F03D 7/00* | (2006.01) | |
| *A23L 27/40* | (2016.01) | |
| *B01D 61/12* | (2006.01) | |
| *B01D 61/58* | (2006.01) | |
| *B01D 63/04* | (2006.01) | |
| *B01D 63/08* | (2006.01) | |
| *C02F 1/44* | (2006.01) | |
| *B01D 61/00* | (2006.01) | |
| *F03G 7/00* | (2006.01) | |
| *C02F 103/08* | (2006.01) | |

(52) U.S. Cl.
CPC ........... *B01D 61/025* (2013.01); *B01D 61/04* (2013.01); *B01D 61/08* (2013.01); *B01D 61/12* (2013.01); *B01D 61/58* (2013.01); *B01D 63/04* (2013.01); *B01D 63/082* (2013.01); *B01D 65/02* (2013.01); *C02F 1/441* (2013.01); *C02F 1/444* (2013.01); *F03G 7/005* (2013.01); *B01D 61/002* (2013.01); *B01D 2311/14* (2013.01); *B01D 2311/246* (2013.01); *B01D 2311/2642* (2013.01); *B01D 2311/2673* (2013.01); *B01D 2313/246* (2013.01); *B01D 2321/04* (2013.01); *B01D 2321/2083* (2013.01); *C02F 2103/08* (2013.01); *C02F 2209/02* (2013.01); *C02F 2209/05* (2013.01); *C02F 2303/10* (2013.01); *C02F 2303/20* (2013.01); *Y02A 20/124* (2018.01); *Y02A 20/131* (2018.01); *Y02W 10/30* (2015.05); *Y02W 10/37* (2015.05)

(58) Field of Classification Search
CPC .... B01D 2311/2673; B01D 2311/2642; B01D 2311/246; B01D 2311/14; B01D 65/02; B01D 61/08; B01D 61/04; B01D 61/022; B01D 63/082; B01D 63/04; B01D 61/58; B01D 61/12; B01D 61/025; B01D 2317/02; B01D 2317/022; B01D 2317/025; B01D 2317/06; B01D 2317/08; F03G 7/005; A23L 27/40; Y02A 20/131; Y02A 20/128; Y02W 10/37; Y02W 10/30; C02F 2303/10; C02F 2103/08; C02F 1/444; C02F 1/441; C02F 2303/20; C02F 2209/05; C02F 2209/02; A23V 2002/00

See application file for complete search history.

(56) References Cited

U.S. PATENT DOCUMENTS

| | | |
|---|---|---|
| 2007/0080113 A1 | 4/2007 | Vuong |
| 2011/0044824 A1 | 2/2011 | Kelada |
| 2012/0267306 A1 | 10/2012 | McGinnis et al. |

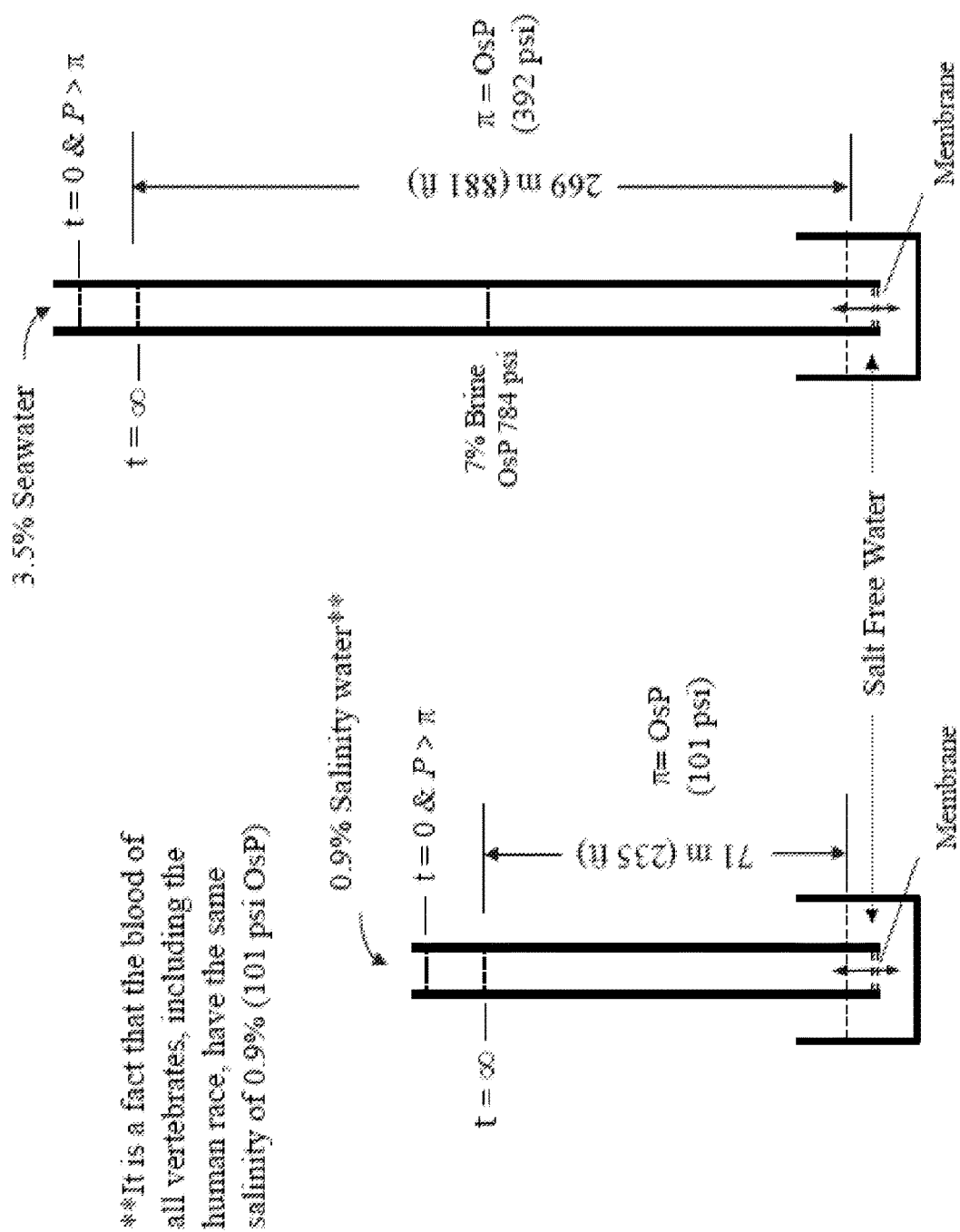
FIG. 1: Simulating Osmotic Pressure in Biological Systems and Seawater

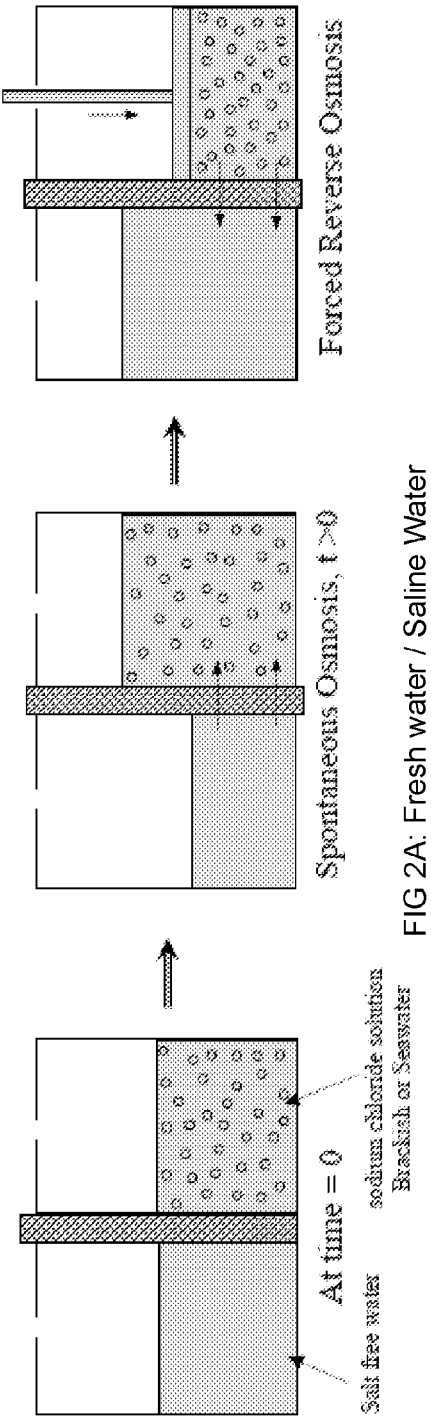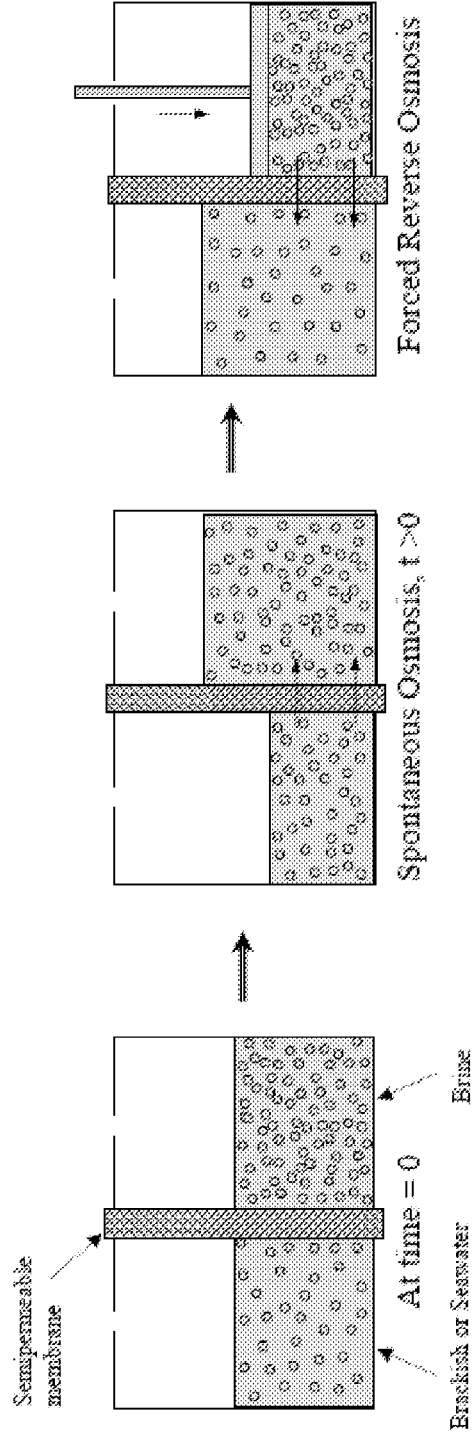
FIG. 2A-2B: The Concept of Osmosis & Reverse Osmosis of fresh water and seawater.

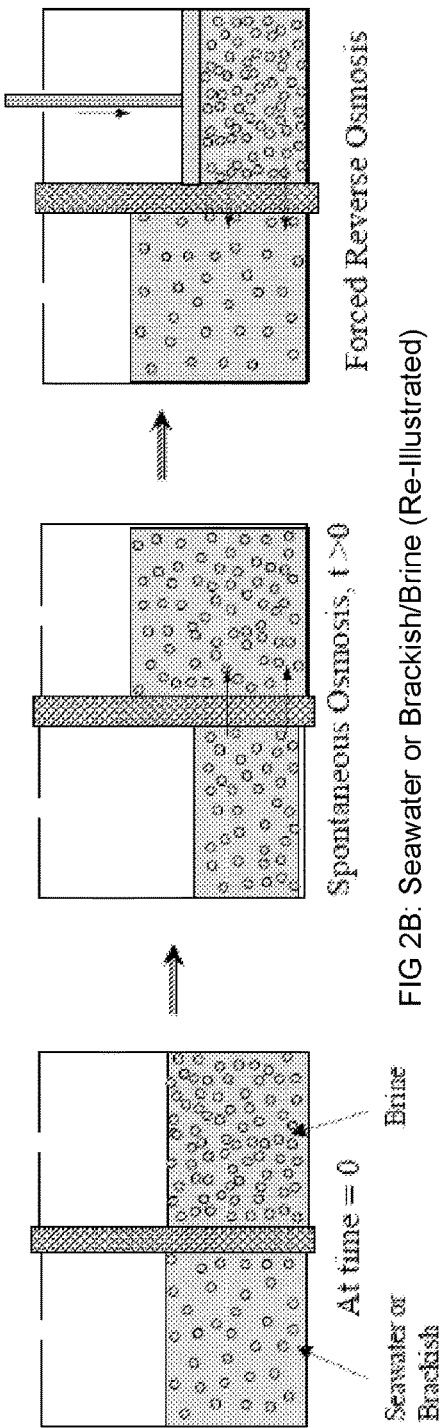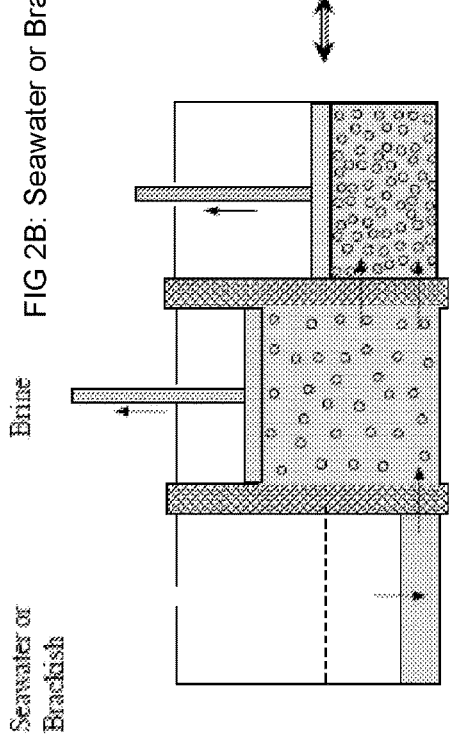
FIG. 2C-2D: The Concept of Hypersalinity Osmosis & Reverse Osmosis

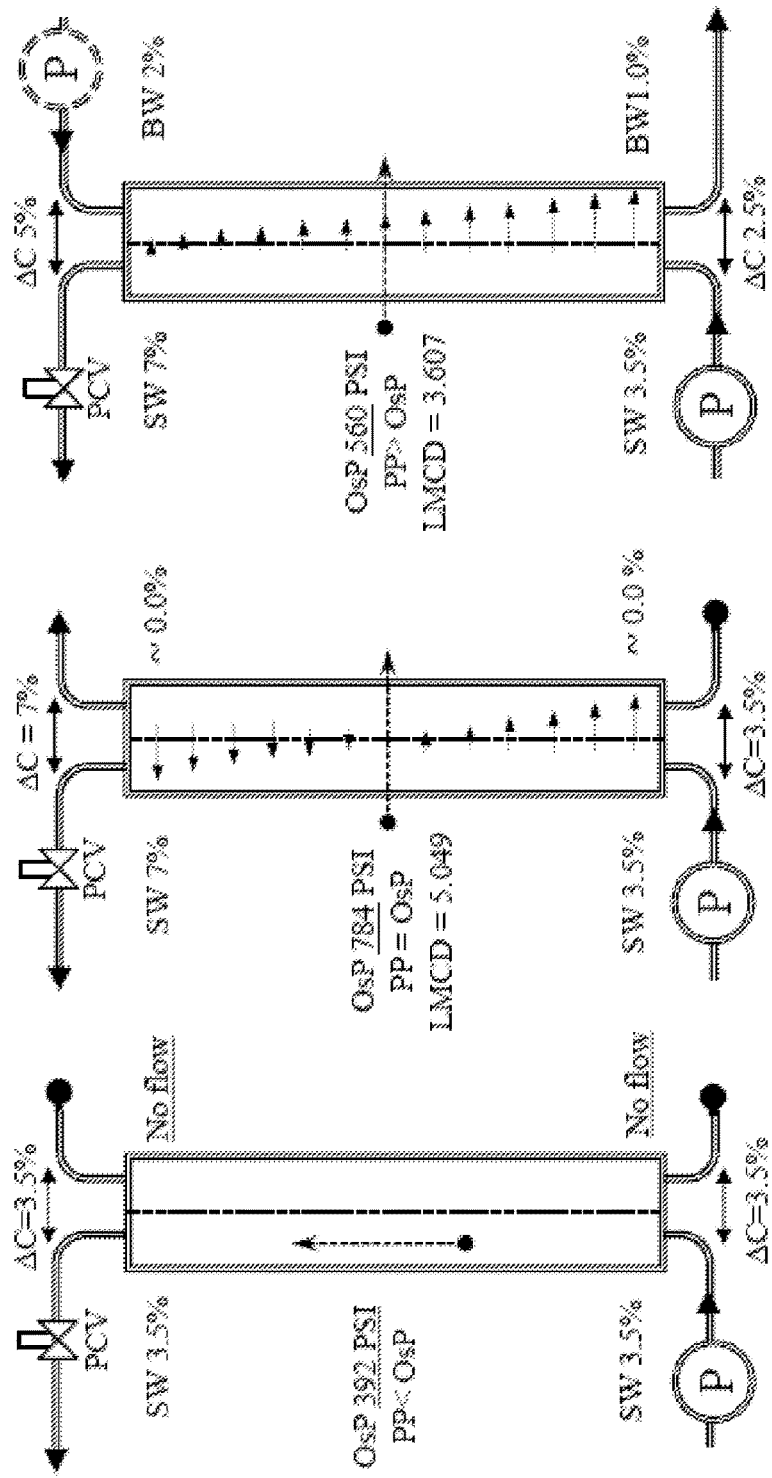

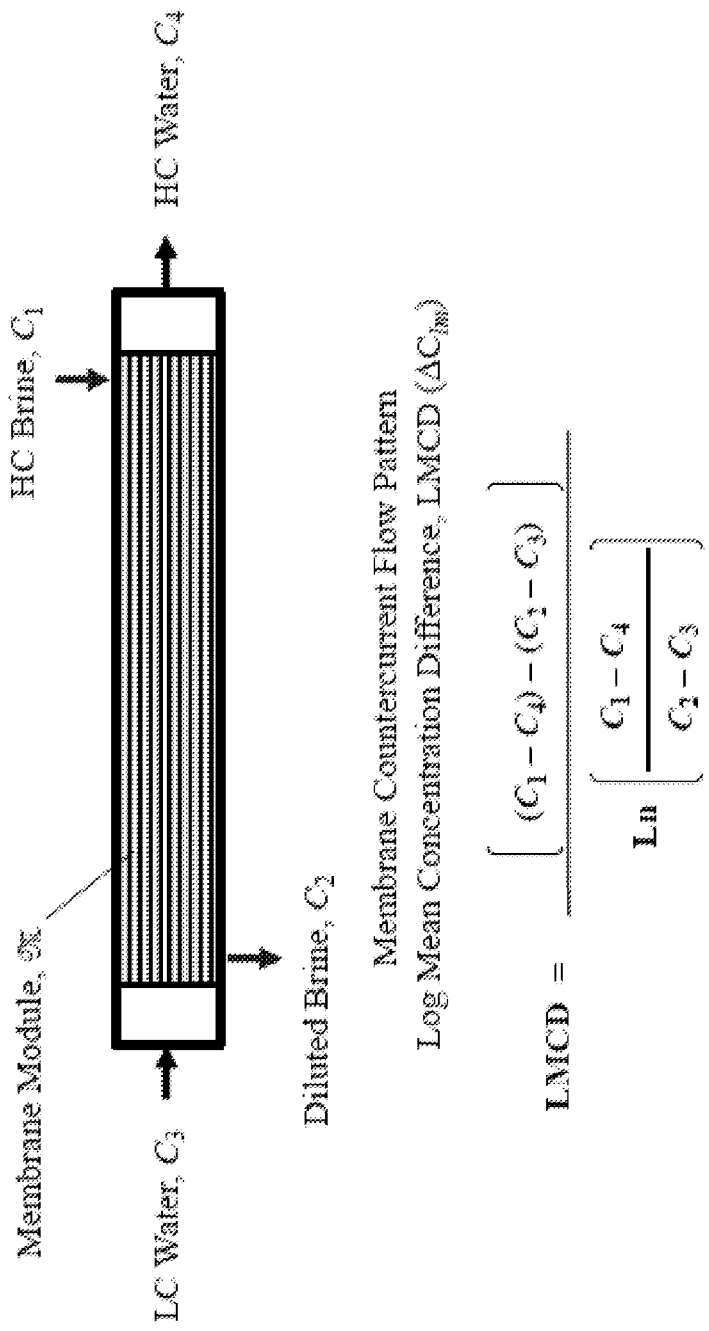
FIG. 4: Log Mean Concentration Difference Estimation

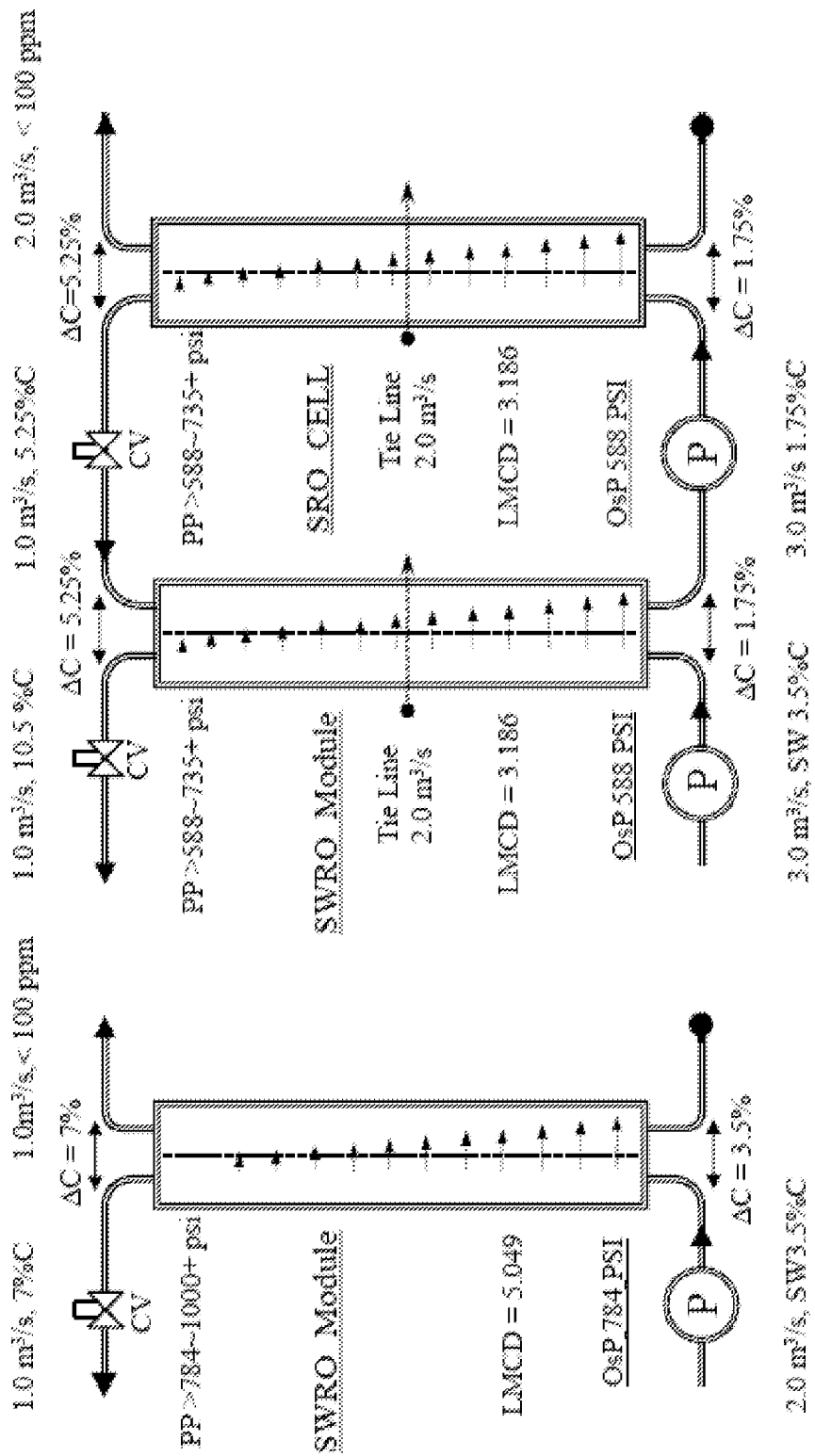
FIG. 5A-5B: The Concept of Seawater Symbiotic Reverse Osmosis [SRO] Desalination

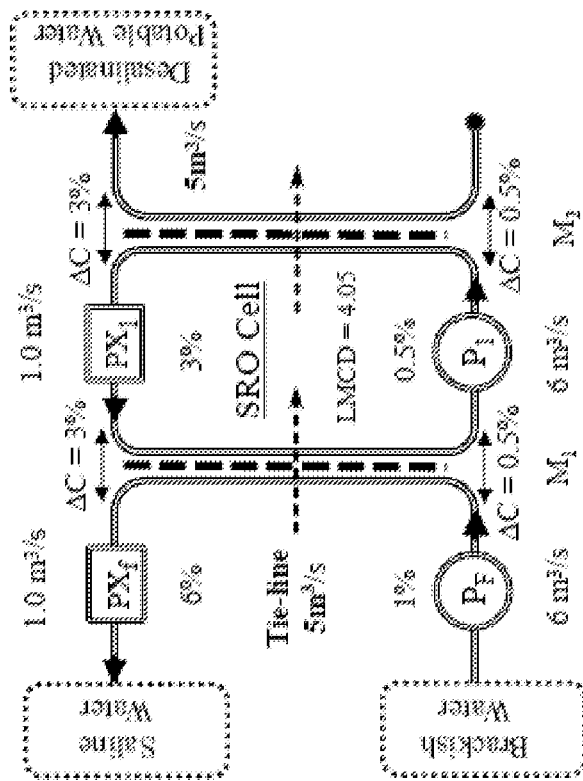

FIG 6A: 1% Brackish Water Desalination for 83% Recovery at Differential Salinity Concentration of 4% (OsP=672PSI) with One (1) RO Module

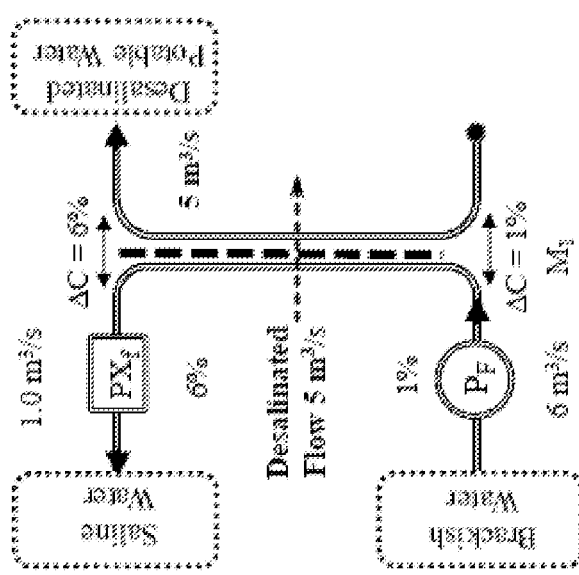

FIG 6B: 1% Brackish Water Desalination for 83% Recovery at Differential Salinity Concentration of 3% (OsP=336PSI) with Two (2) SRO Cell FIG. 6A-6B: The Concept of 1% Brackish Water Symbiotic Reverse Osmosis [SRO].

Number of stages may increase in case of reducing salinity differential while maintaining flow rate constant.

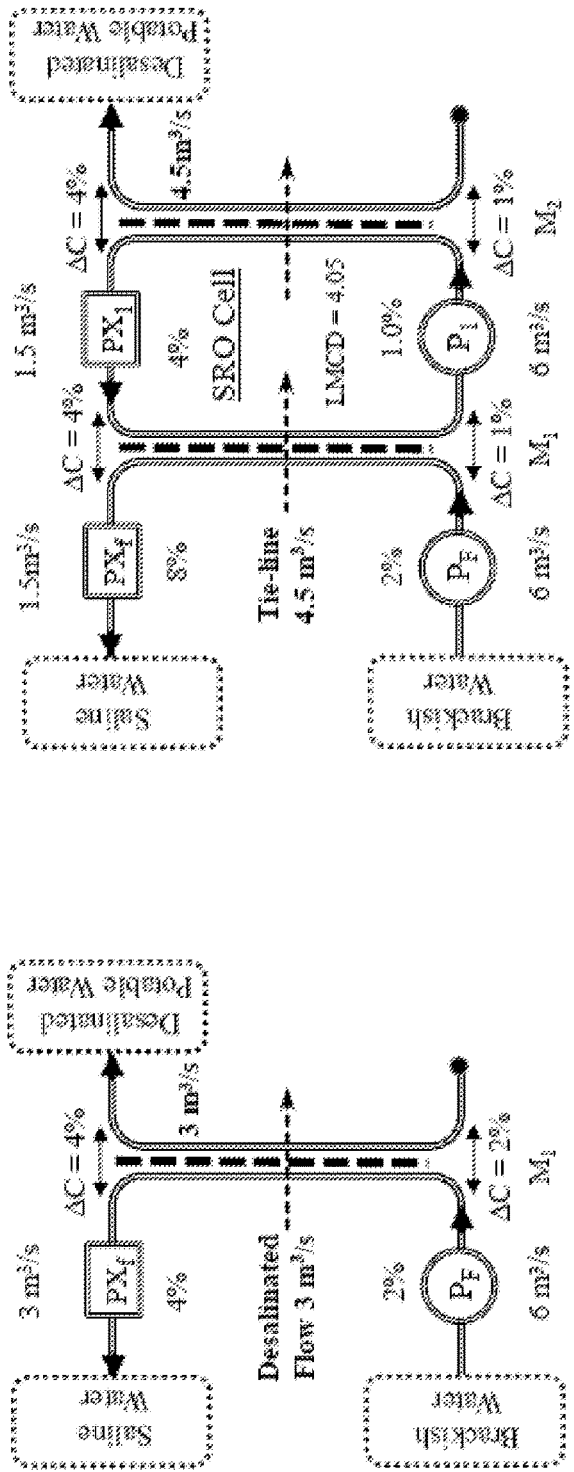

FIG. 7A: 2% Brackish Water Desalination for 50% Recovery at Differential Salinity Concentration of 4% (OsP=448PSI) with One RO Module FIG. 7B: 2% Brackish Water Desalination for 75% Recovery at Differential Salinity Concentration of 4% (OsP=448PSI) with One SRO Cell FIG. 7A-7B: Single Cell [SRO], 2% Brackish water @ 75% Recovery.
Number of stages may increase in case of increasing flow recovery while increasing rejected brine salinity.

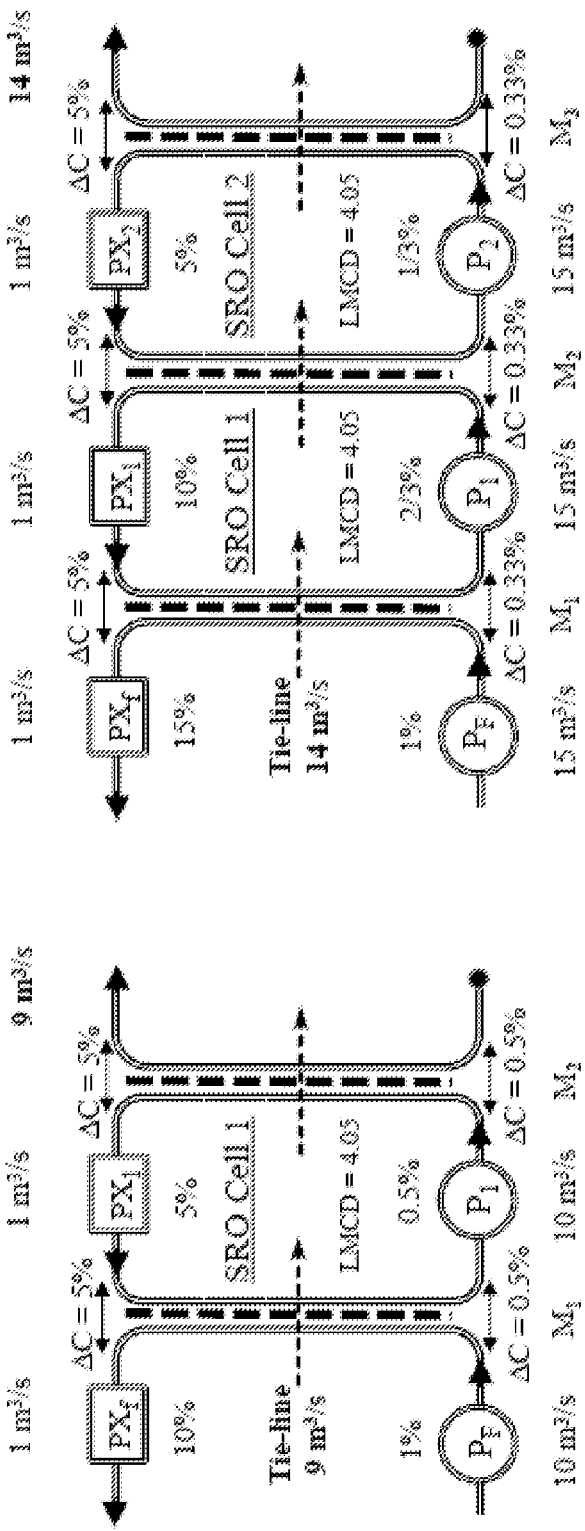

FIG. 8A: 1% Brackish Water Desalination for 90% Recovery at Differential Salinity Concentration of 5% (OsP=560PSI) with One SRO Cell FIG 8B: 1% Brackish Water Desalination for 93% Recovery at Differential Salinity Concentration of 5% (OsP=560PSI) with Two SRO Cells FIG. 8A-8B: Twin Cell [SRO], 1% Brackish water @ 93% Recovery.

Number of stages may increase in case of increasing processed flow, while maintaining salinity differential constant

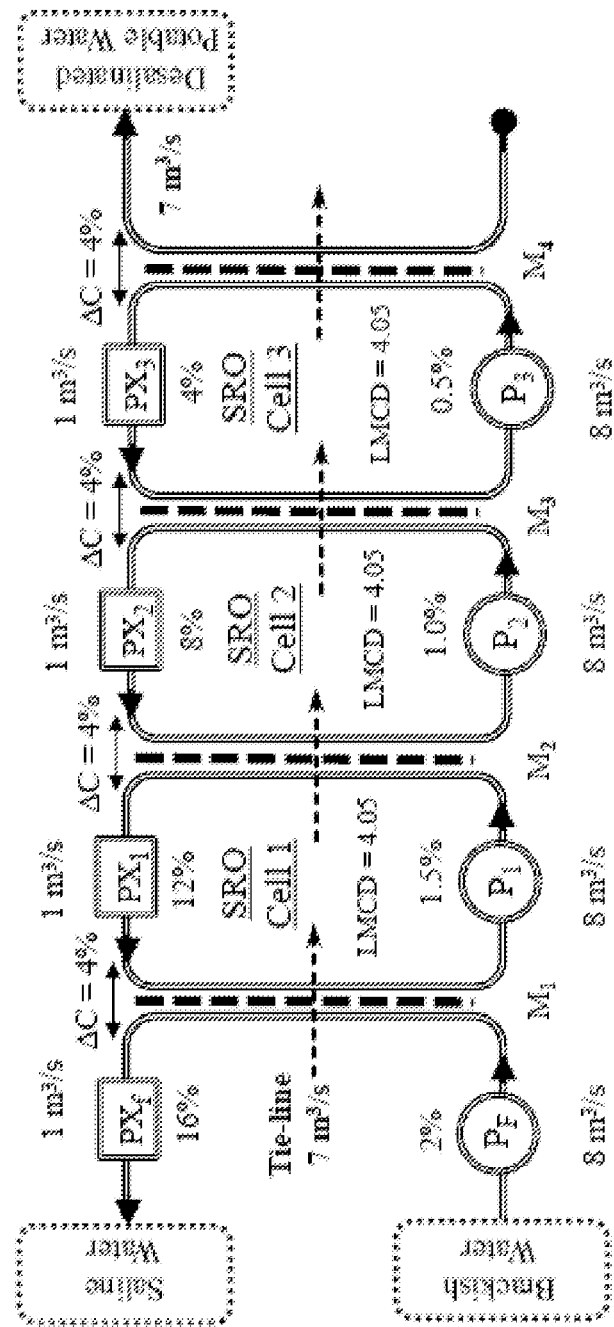
FIG. 9: Tri-Cell [SRO], 2% Brackish water @ 85% Recovery, while maintaining Salinity differential constant.

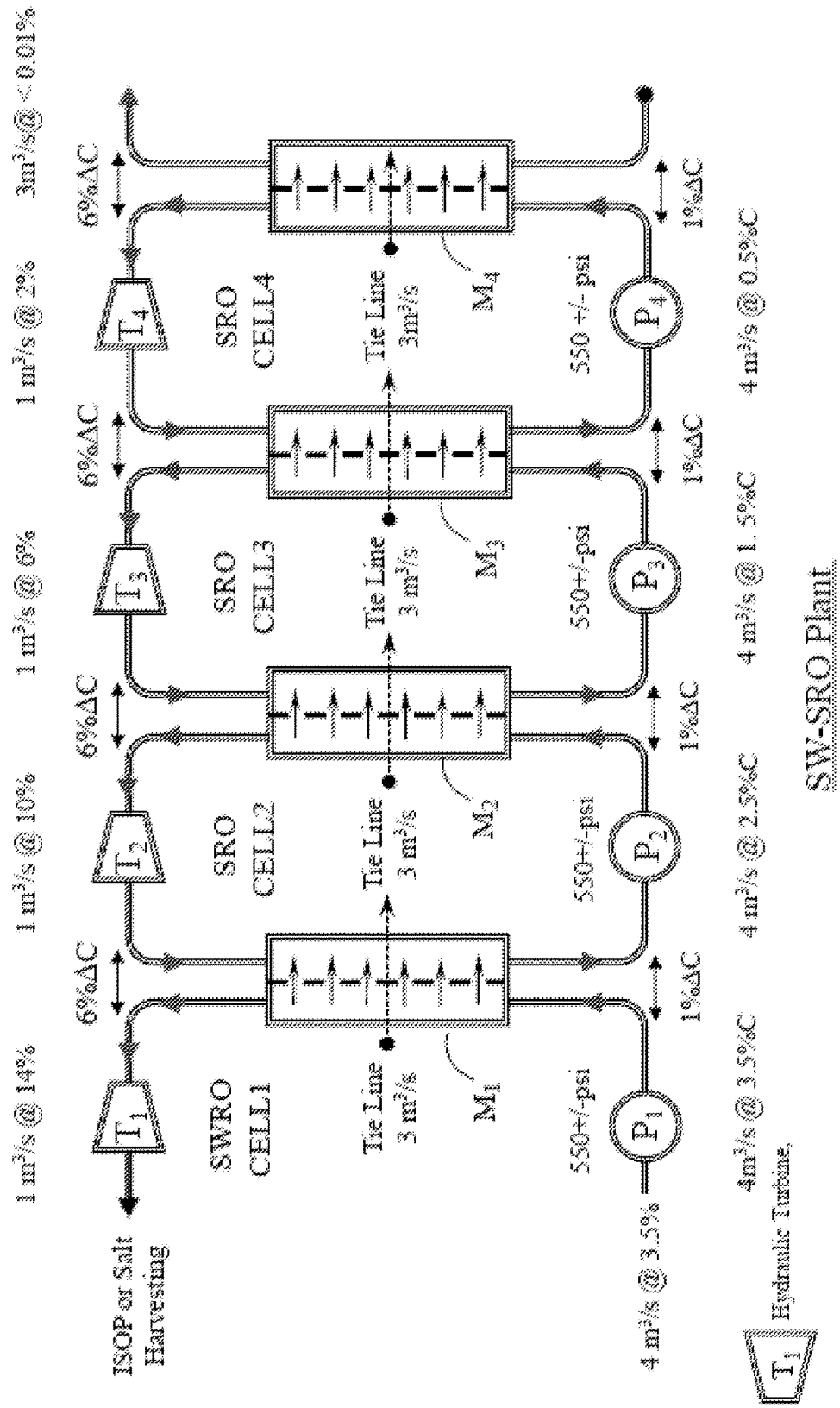
FIG. 10: Seawater desalination with one (1) SWRO and three (3) SRO stages operating within the range of 3.5-14% salinity, with potential desalinated water recovery of 75% at differential salinity concentration of 6% and with potential energy recovery of 25-40% with hydraulic turbines or pressure exchangers.

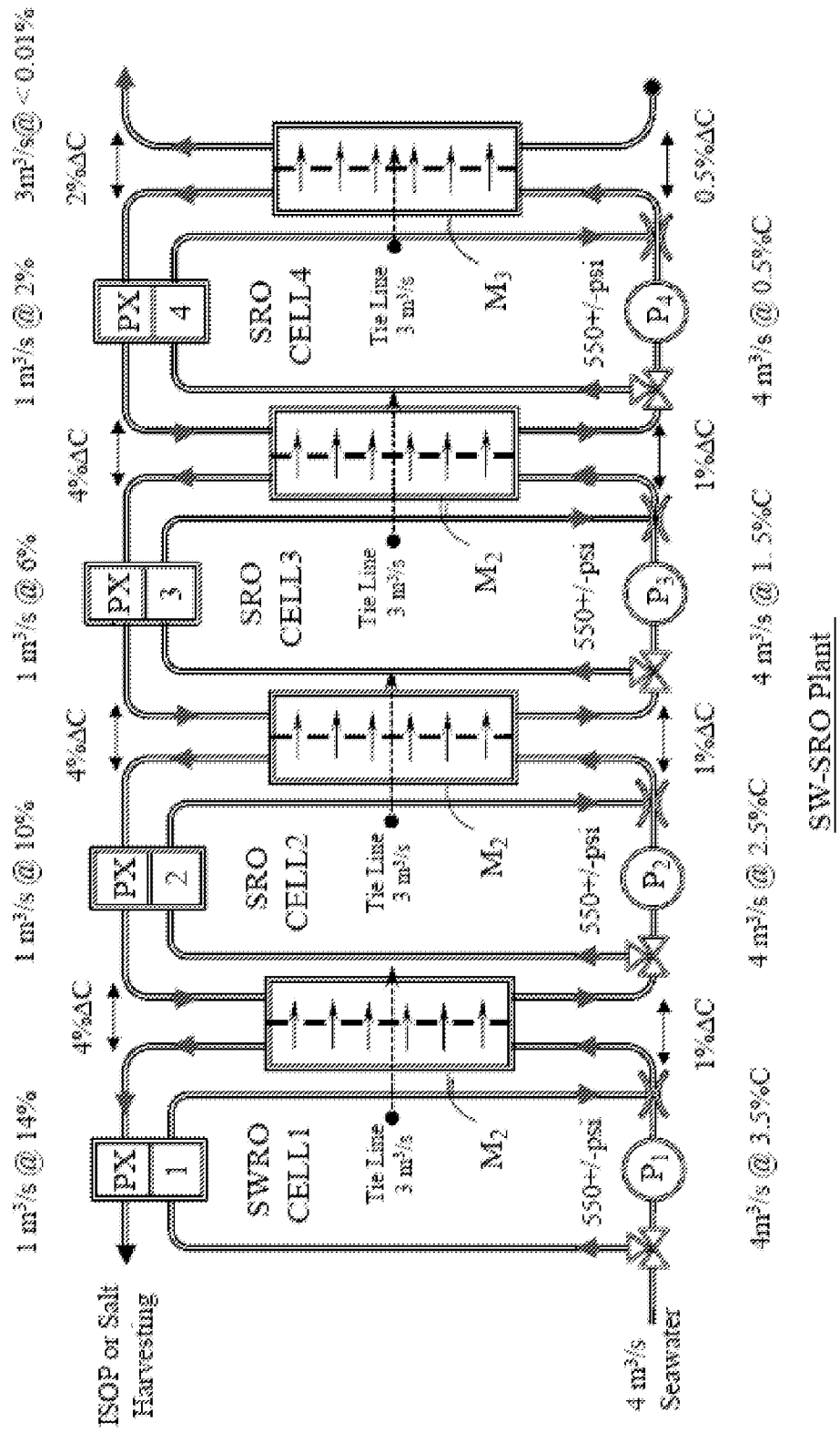
FIG. 11: Seawater desalination scheme of FIG 10, with one (1) SWRO and three (3) SRO stages operating within the range of 3.5-14% salinity, with potential desalinated water recovery of 75% and up to 40% power requirements reduction by using pressure exchangers.

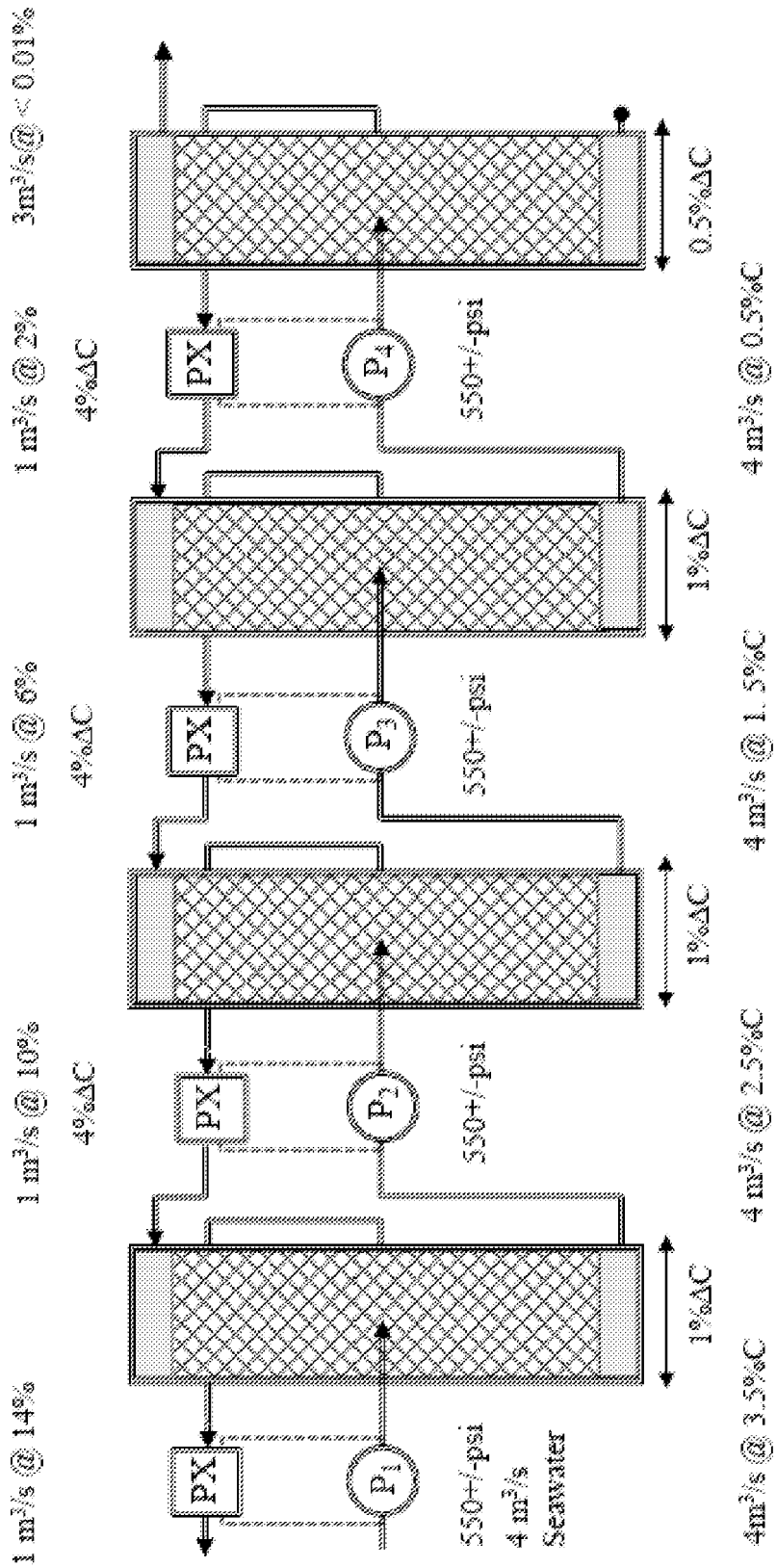
FIG. 12: Flat Sheet Membrane [FSM] equipment arrangement of seawater desalination recovery of 75%, in accordance with the scheme of FIG 10, comprising one (1) SWRO and three (3) SRO stages operating within the range of 3.5-14% salinity at Differential Salinity Concentration of 4%. Flow Reynolds Number of 3,000-3,500 for fouling mitigation to avoid membrane's stagnation zones.

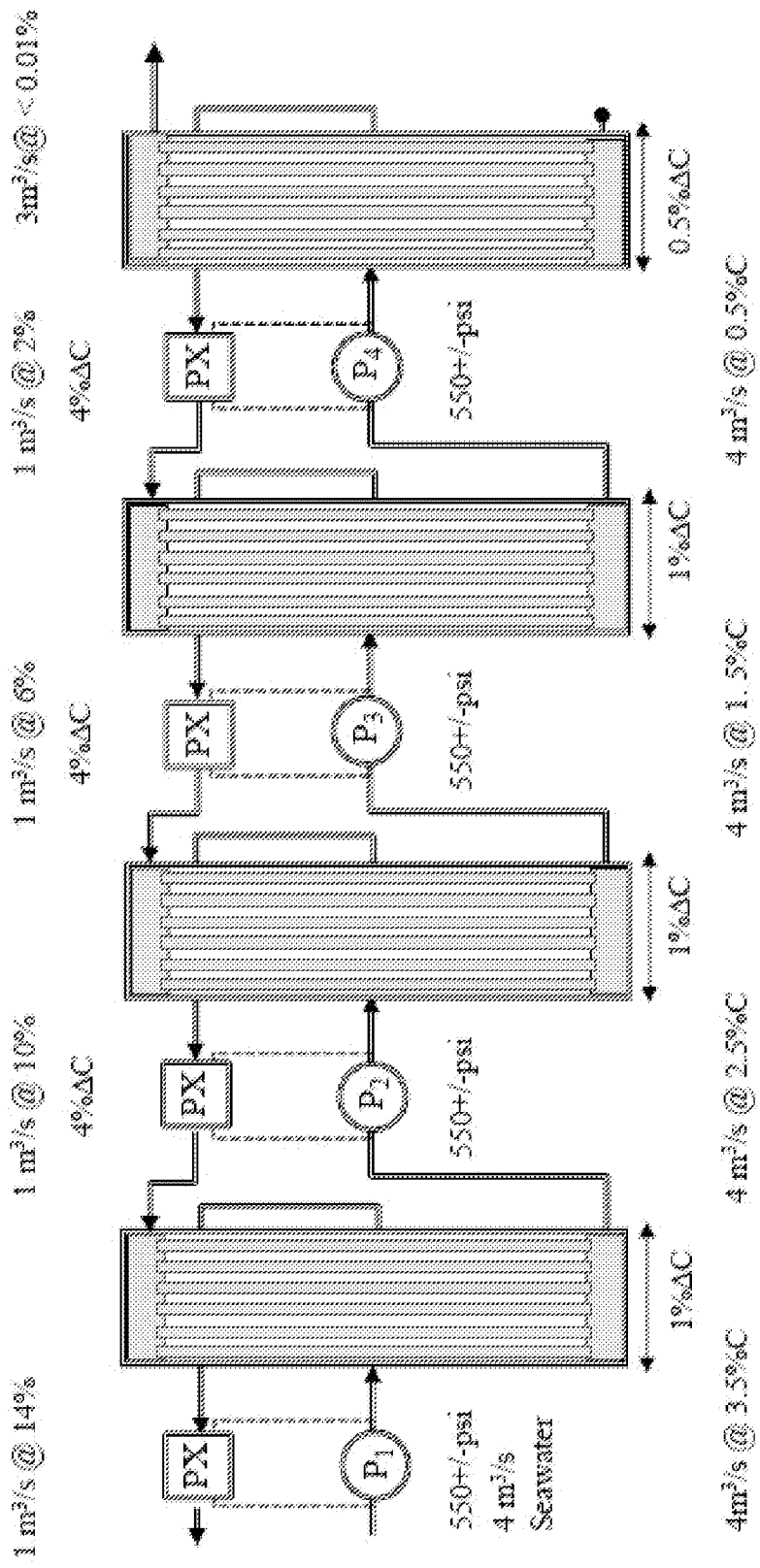
FIG. 13: Hollow Fiber Membrane [HFM] equipment arrangement of seawater desalination recovery of 75%, in accordance with the scheme of FIG 10, comprising one (1) SWRO and three (3) SRO stages operating within the range of 3.5-14% salinity at Differential Salinity Concentration of 4%. Flow Reynolds Number of 3,000-3,500 for fouling mitigation to avoid membrane's stagnation zones.

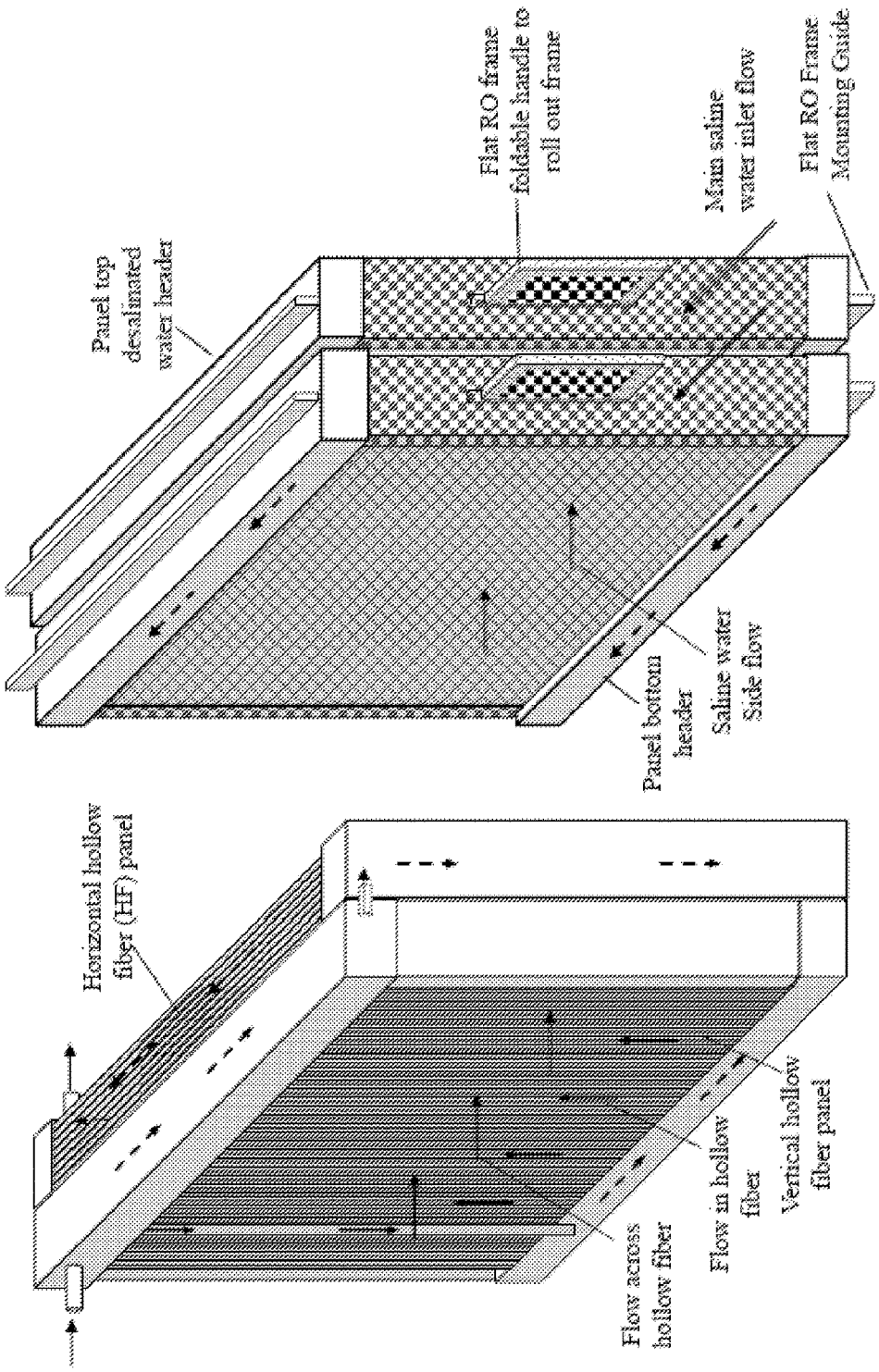
FIG. 14A-14B: Inventor's patented and patent pending membrane designs for use in Hypersalinity processes and applications for exchanging water of different salinity; ISOP and SRO Systems

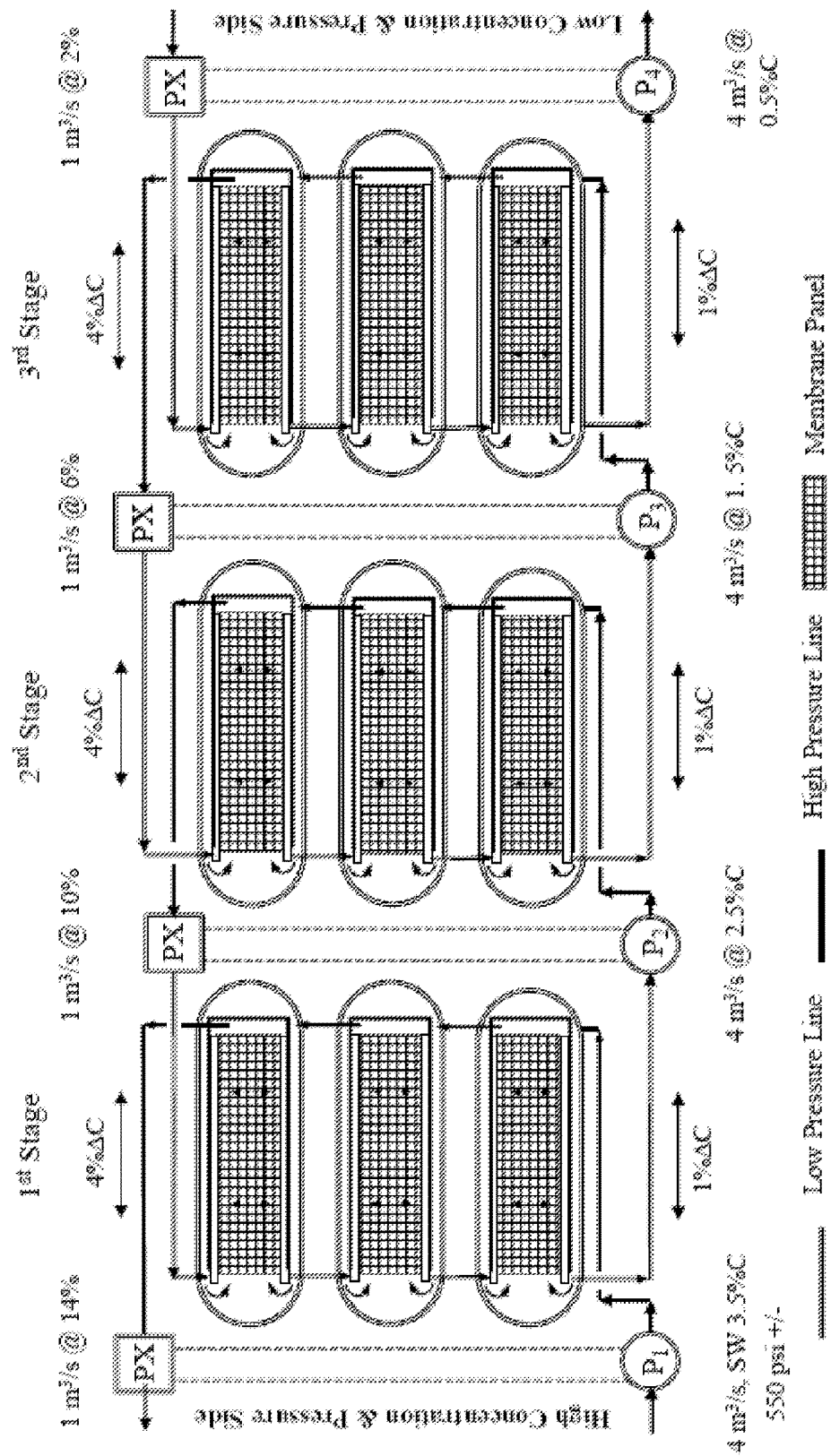

FIG. 15: Flat Sheet Membrane [FSM] train layout of just 3 cells of a 4 cell train for seawater desalination of 75% recovery of the example scheme of FIG 11, where each cell comprises one or more sequential or parallel vessels, depending of flow rate. In these 3 cells, high salinity water is exchanged with low salinity water. Salt free product water exists at the 4th cell of same design (not shown).

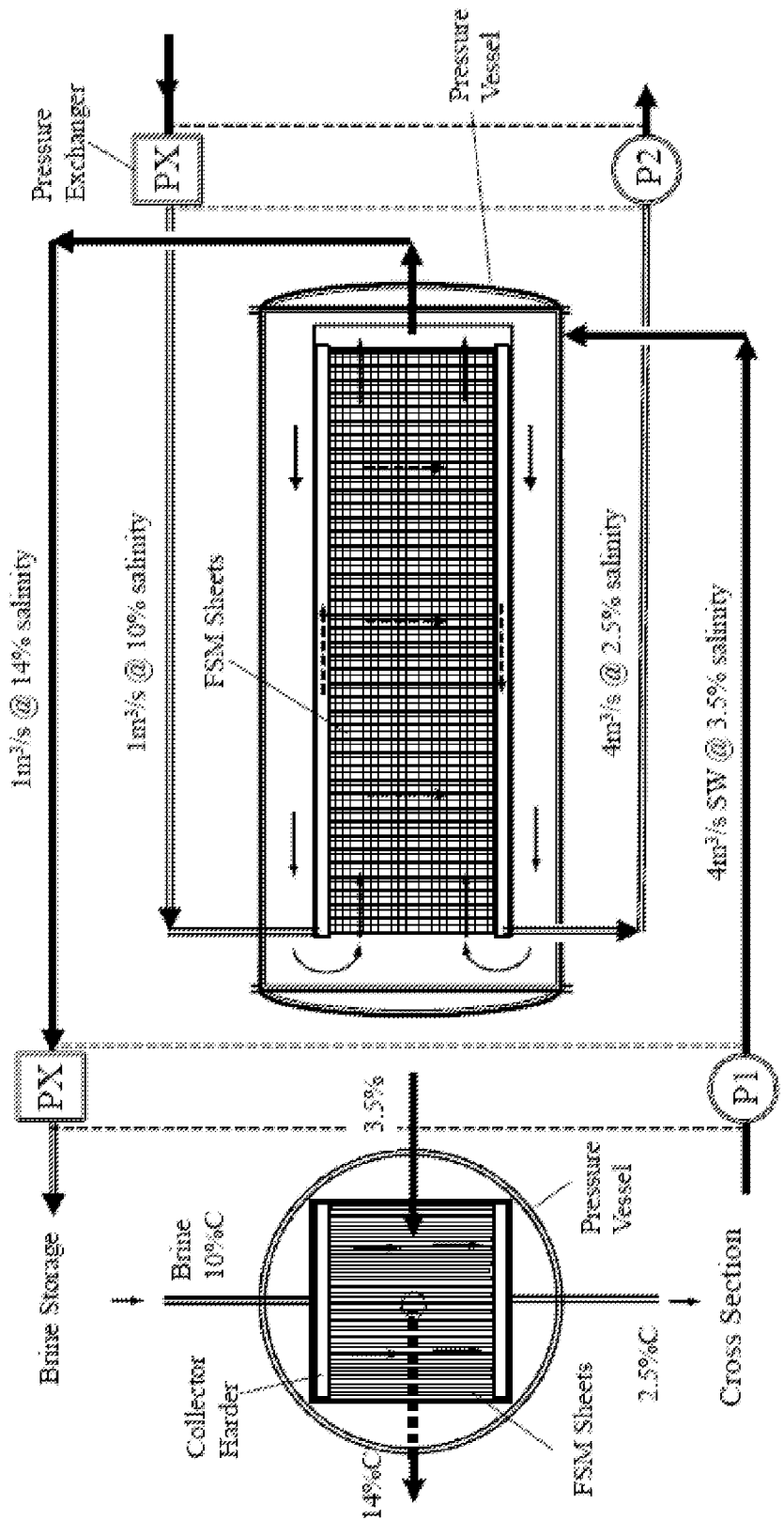
FIG 16: First stage for seawater desalination as shown in FIG 15. This same concept is applicable in Induced Symbiotic Osmosis [ISO] train. Vessels are large and grade mounted, in or out doors. Membrane panels (Ref. FIG 14) can be up to 1m x 1m and up to 2 m or more in length, operating at 700 psi.

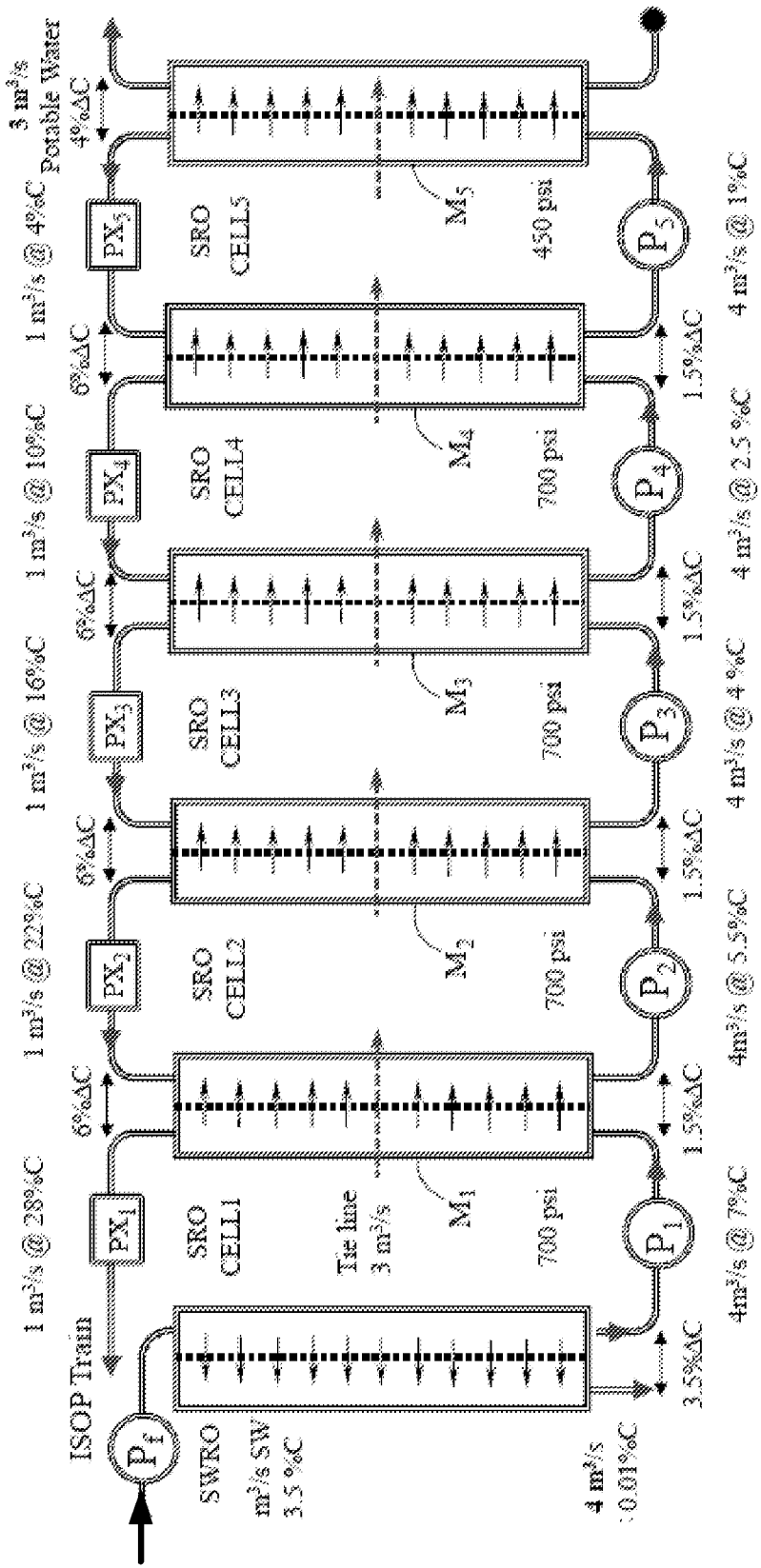
FIG 17: SWRO & Multi-Cell [SRO] 3.5% Seawater @87.5 % Recovery, up to 40% Power reduction by Pressure Exchangers Maximized Hypersalinity symbiotic reverse osmosis [SRO] plant for desalinating seawater at a recovery of 87.5%, at Differential Salinity Concentration of 6%, brine rejection of 28% which can be used to produce salt or generate power at maximum potential of 16 KW/Liter.

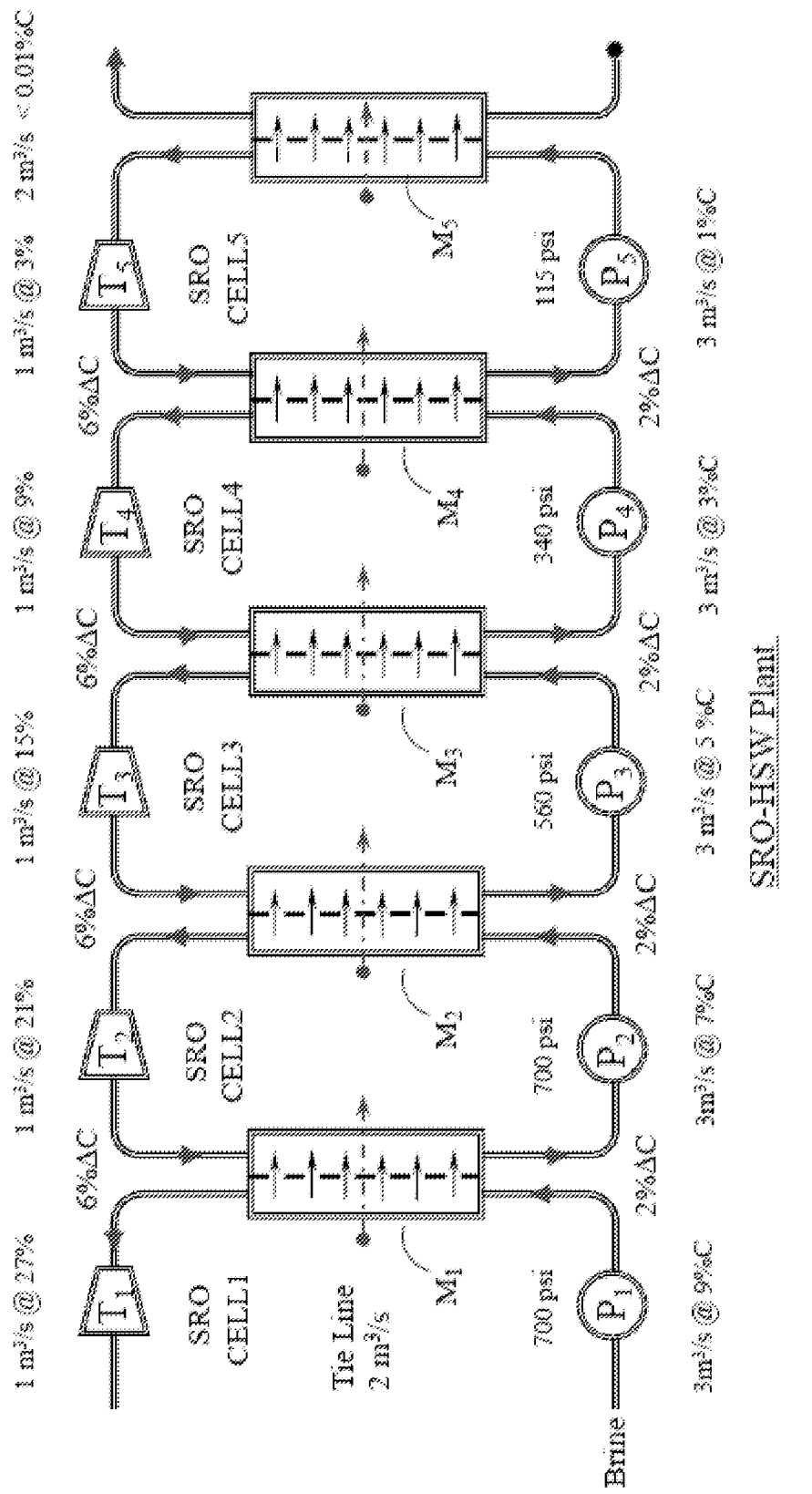
FIG 18: Multi-Cell [SRO] 9% brine feed @ 67% Recovery for desalination of aquifers or evaporation ponds hypersaline brines with rejected lower salinity brines from other desalination processes at Differential Salinity Concentration of 6%. Brine rejection of 27% which can be used to produce salt or generate power.

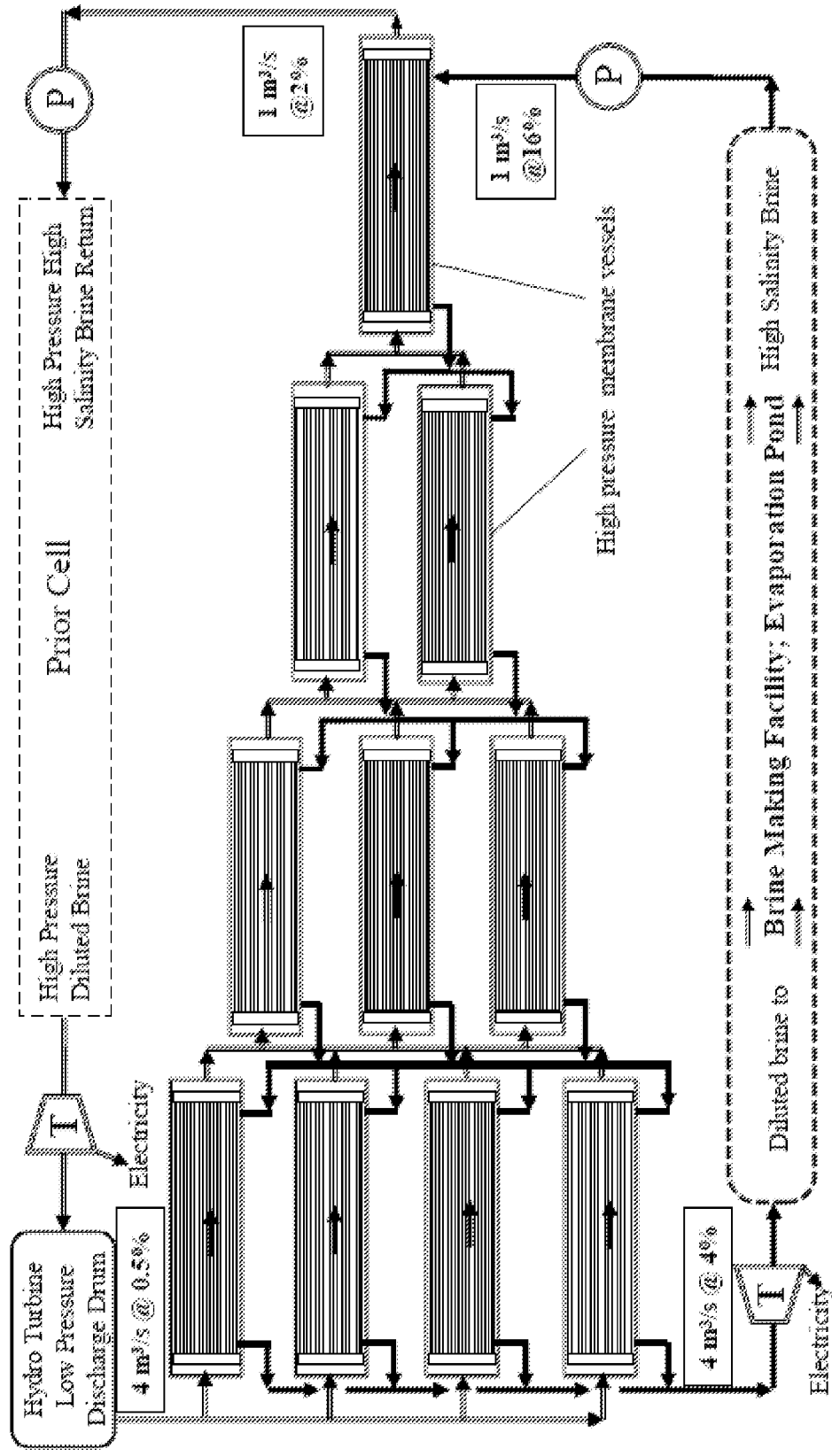
FIG 19: Typical membrane modules sequencing in multi-trains of ISOP or SRO Plants employing Hollow Fiber Membrane Frame [HFM] or Flat Sheet Membrane (FSM), for sustaining flow Reynolds Number of 3000-3,500 for membrane fouling mitigation.

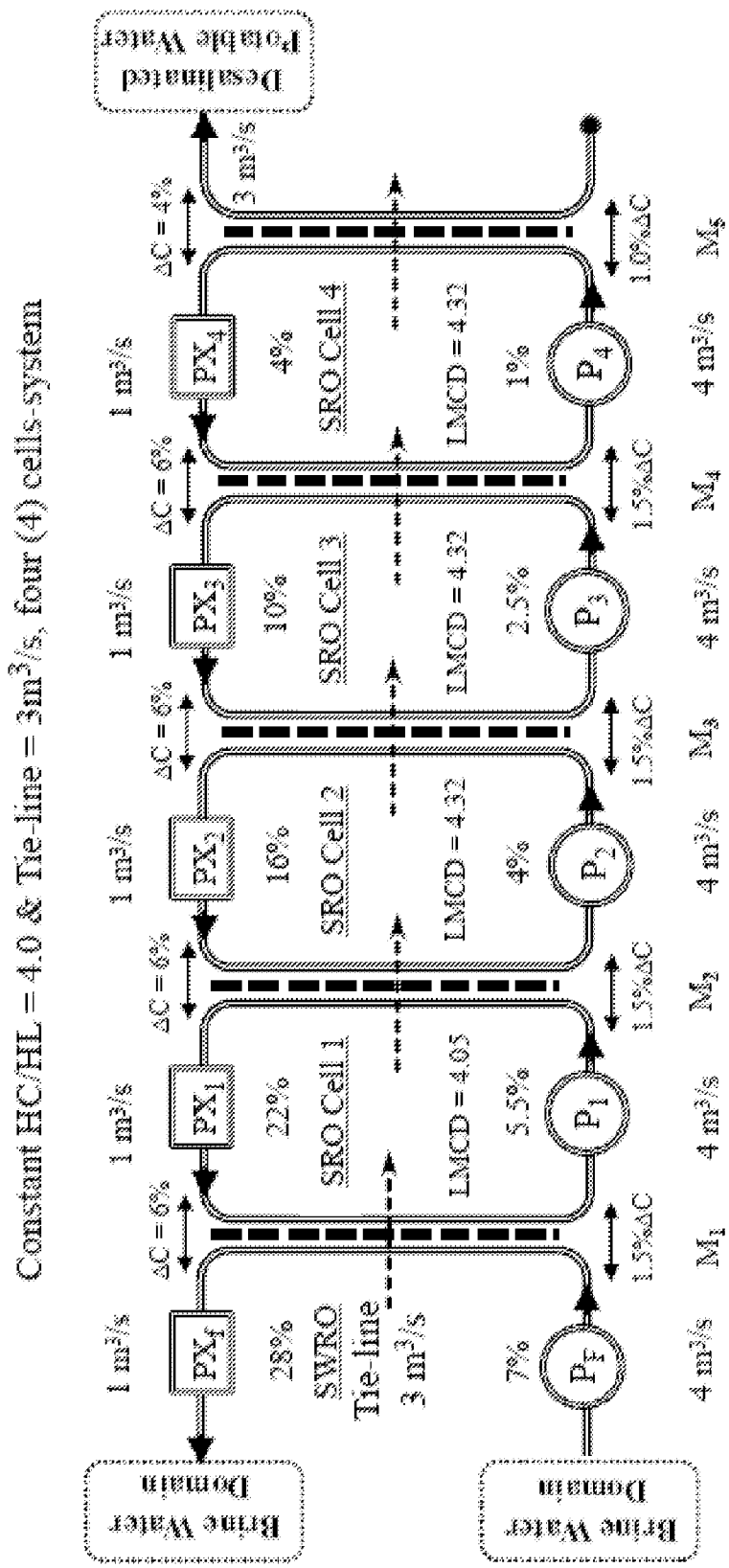
FIG 20: Multi-Cell [SRO] desalination of 7% brine feed @75 % Recovery at differential salinity concentration of 6%. Brine rejection of 28% can be used to recover salt or generate power.

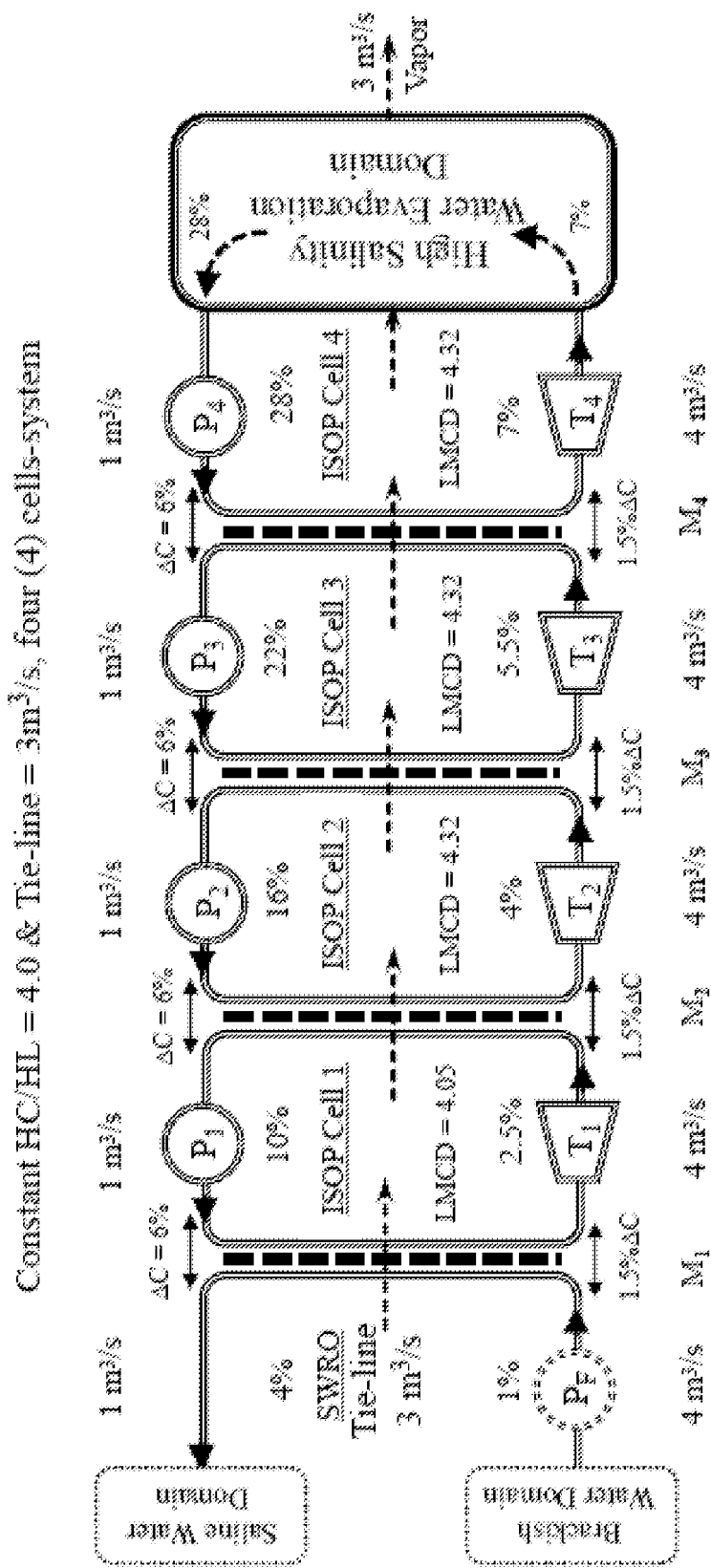
FIG 21: Multi-Cell Induced Symbiotic Osmosis Power Generation [ISOP] brine train of four (4) cells for electric power generation, at differential salinity concentration of 6%. Open domain evaporation salinity range is 7% -28%.

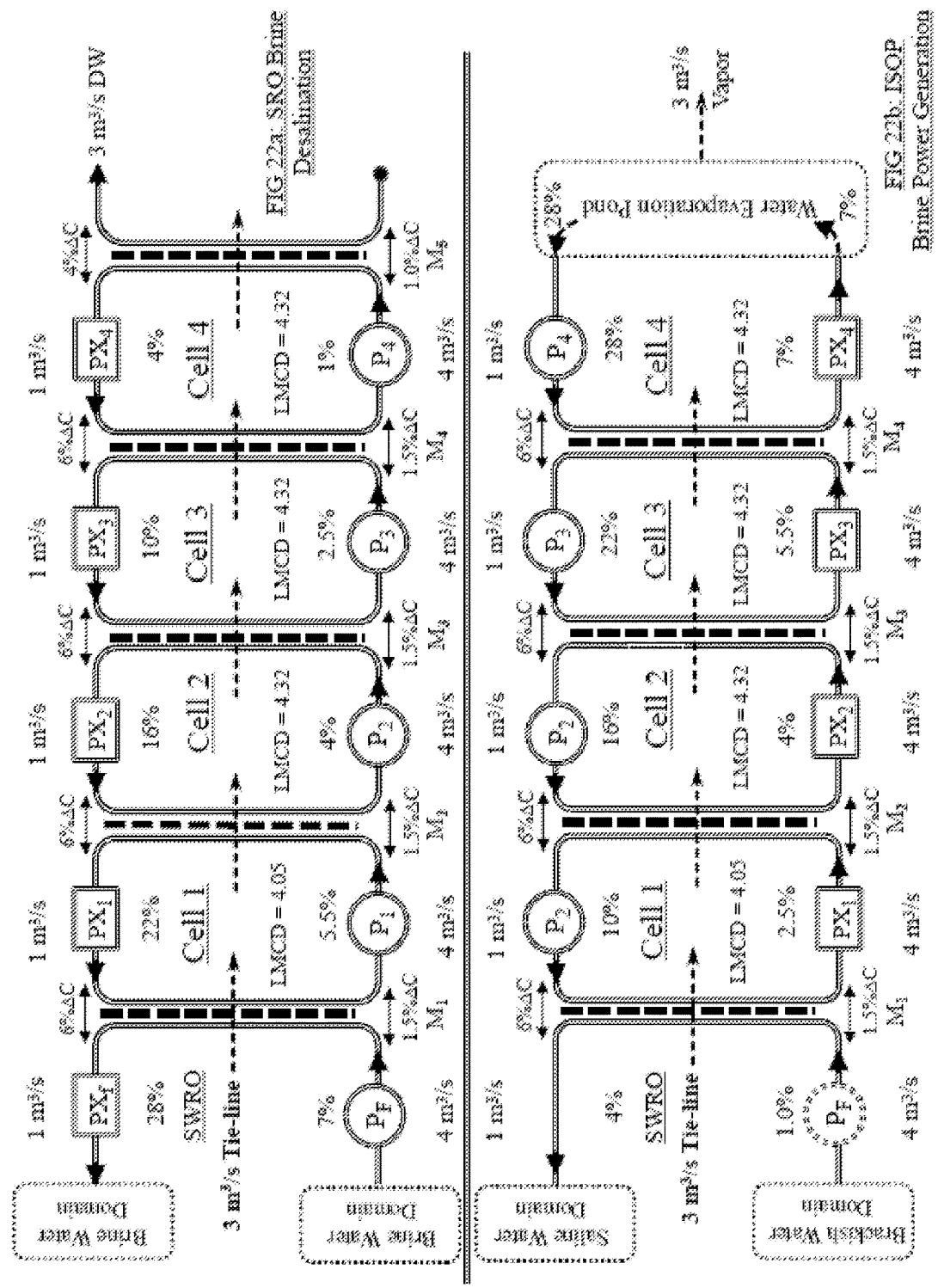
FIG 22: Process Reversibility of Symbiotic Reverse Osmosis [SRO] and Induced Symbiotic Osmosis Power Generation [ISOP]

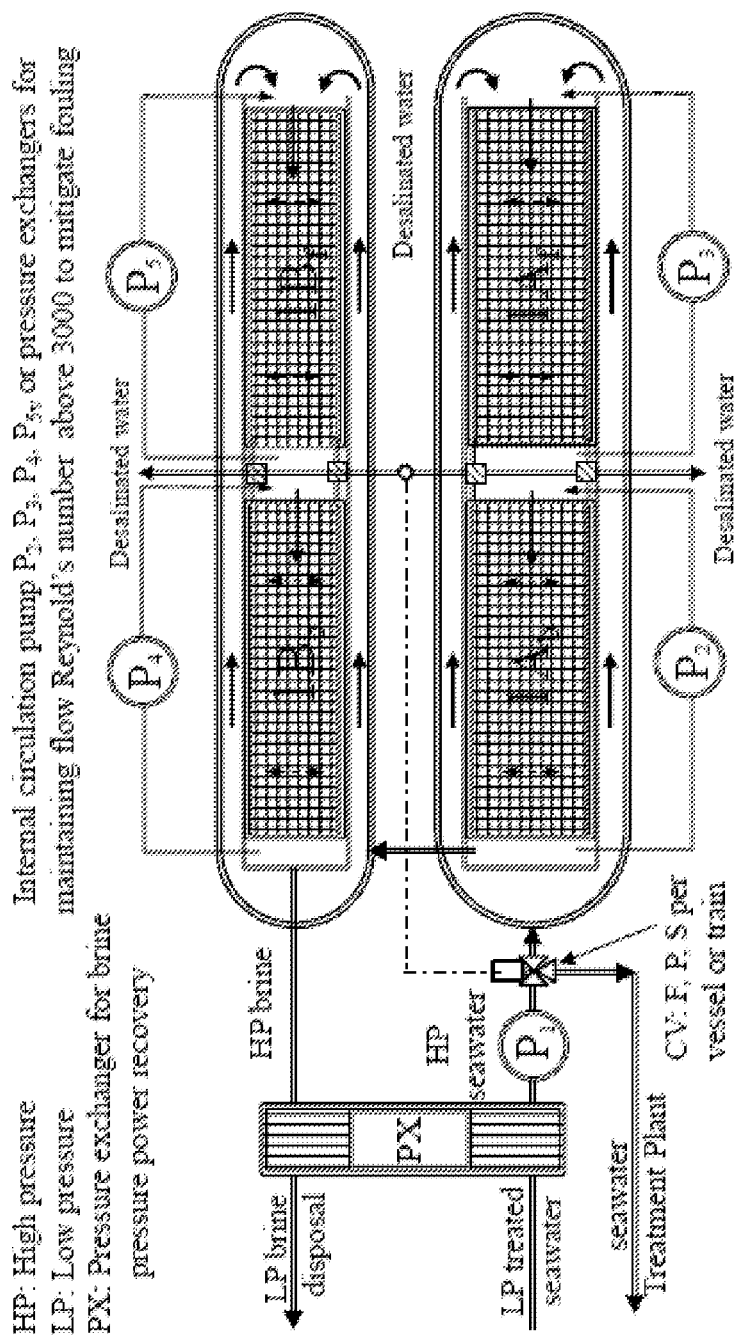
Fig 23: Agitated Axial Flat Sheet Membranes (FSM) Variable Flow Reverse Osmosis Scheme with reference to FIG 15

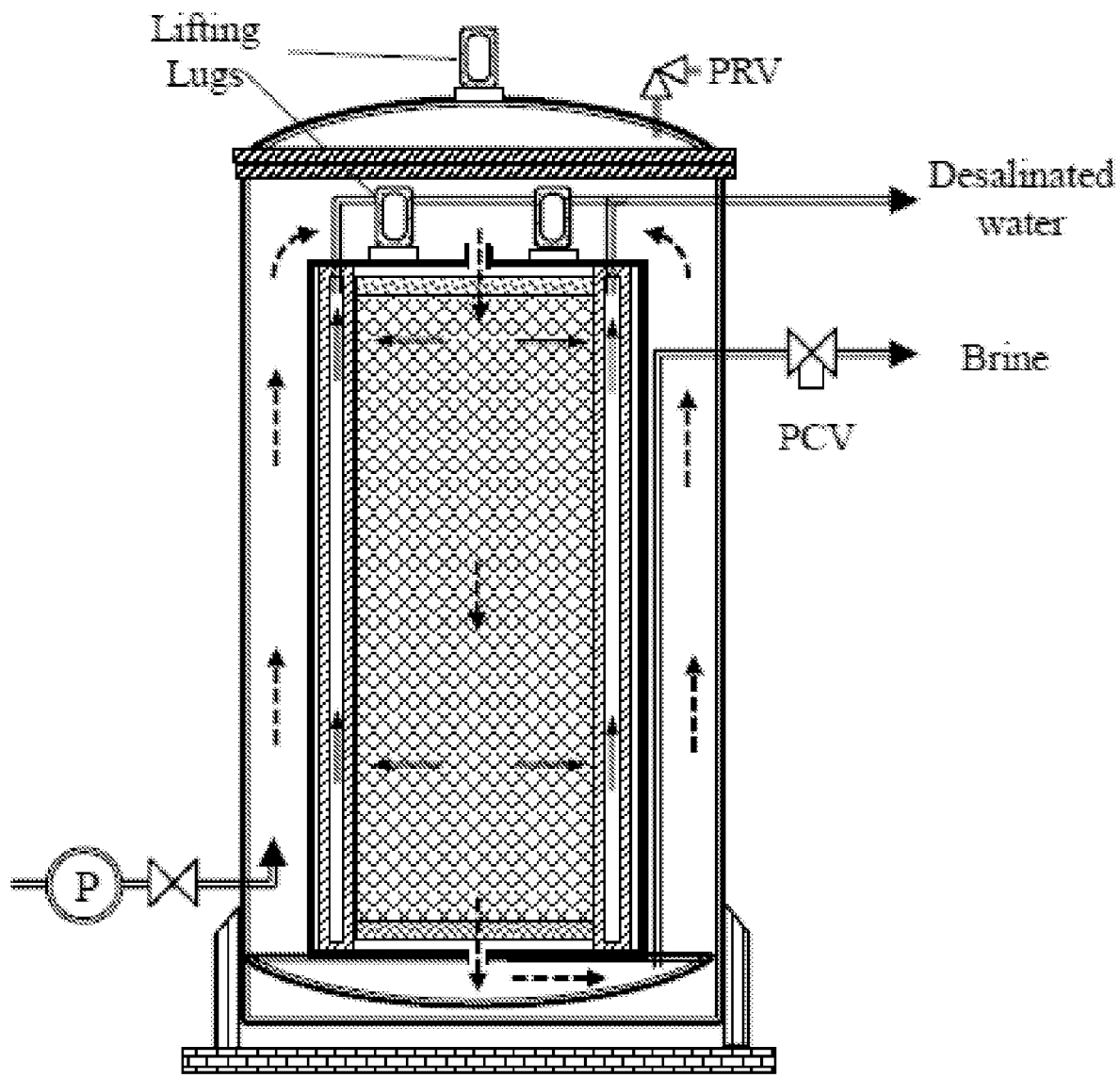
FIG 24: Single stage vertical well axial flow [FSM] RO, above or for below grade installation

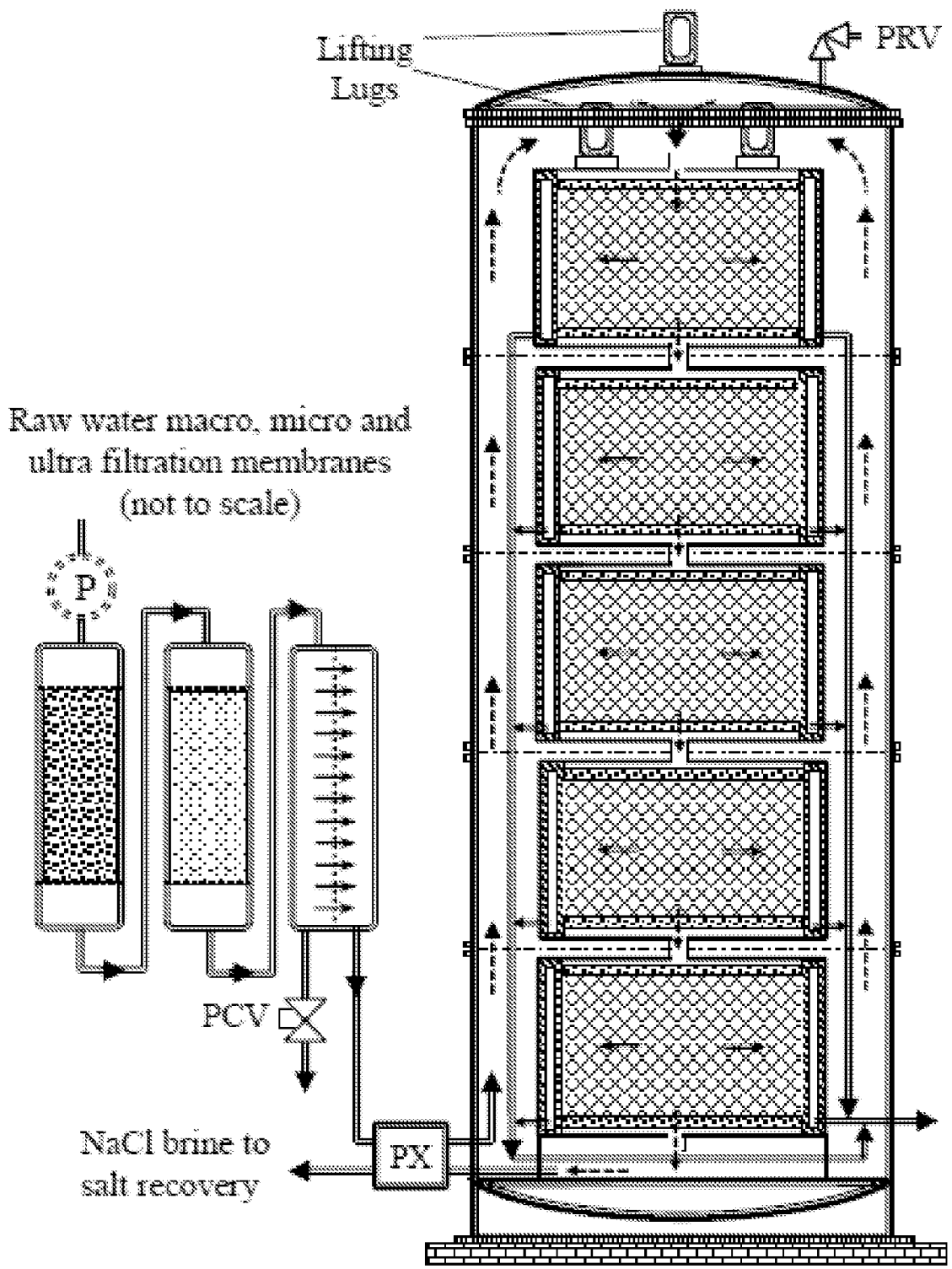
FIG 25: Multi-stages desalination tower & accessories Axial flow [FSM] RO membrane process Design and Operating Parameters:

| | |
|---|---|
| BW | Brackish water |
| C | Seawater dissolved salt % in terms of gram/liter is 3.5% = 35g/1,000cc = 35,000 part/million). At 60F, salt saturation is 26.4 gram/100 gram of solution with specific gravity of 1.204. Maximum solubility of NaCl in water at 25 °C is 357 mg/ml 1% salinity = 10,000 part per million. |
| $\Delta C$ | Cells concentration differentials (<7%) determined by membrane operating pressure integrity. |
| CV | Back pressure control where set P = Outlet OsP. |
| DS | Desalinated water salinity %. HS: Hyper Salinity. HSW: Hyper Salinity Water |
| DW | Desalinated water. |
| E | Potential energy generation. |
| J | Joule unit of energy = 1 kg·m²/s² = 9.48×10⁻⁴ BTU = 2.78×10⁻⁷ kWh |
| LMCD | Log mean concentration difference between membrane terminals. |
| m³/s | Cubic meter/second. Smaller units; liter/s, 100cc/s, etc. can be also used. |
| NE | Net energy generation. |
| OsP, π | Osmotic pressure ~112 psi per 1.0% C., 392 psi @ 3.5% C., 784 psi @ 7.0% C |
| PP | Pump operating pressure less $P_{eff}$. PP must be > OsP |
| $P_{eff}$ | pumping efficiency 75% +/-. |
| PE | pumping energy. |
| PX | Pressure exchanger (self contained generally of 95% efficiency). |
| t | Time in seconds. |
| SW | Seawater at 3.5% salinity mostly sodium chloride |
| SWRO | Seawater reverse osmosis. SRO: Symbiotic Reverse Osmosis of integrated train of cells. |
| T | Hydraulic turbine (85% efficiency including power transmission). |
| UFSW | Ultra filtered seawater |
| W | Watt unit of power = joule / second = J/s, J = w·s. |
| •—→ | Intercellular common tie line flow and direction |

FIG. 26

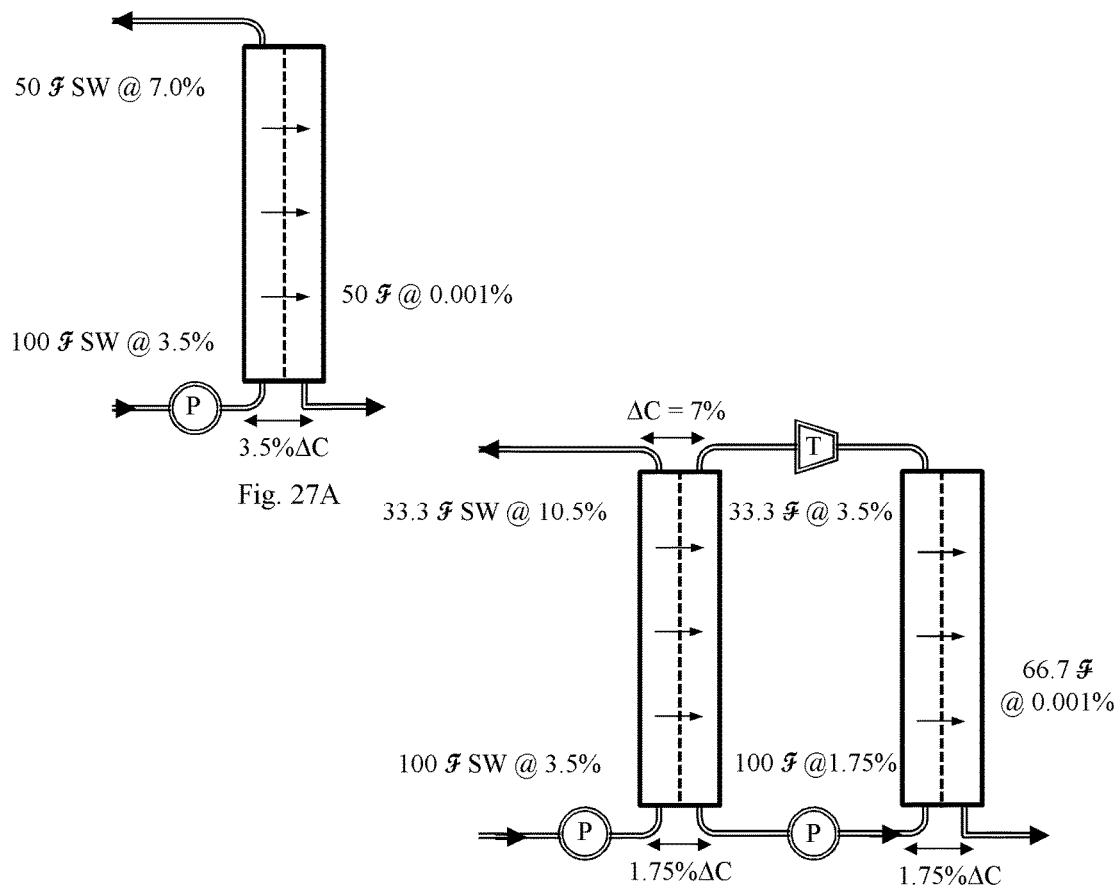
Fig. 27A
Fig. 27B
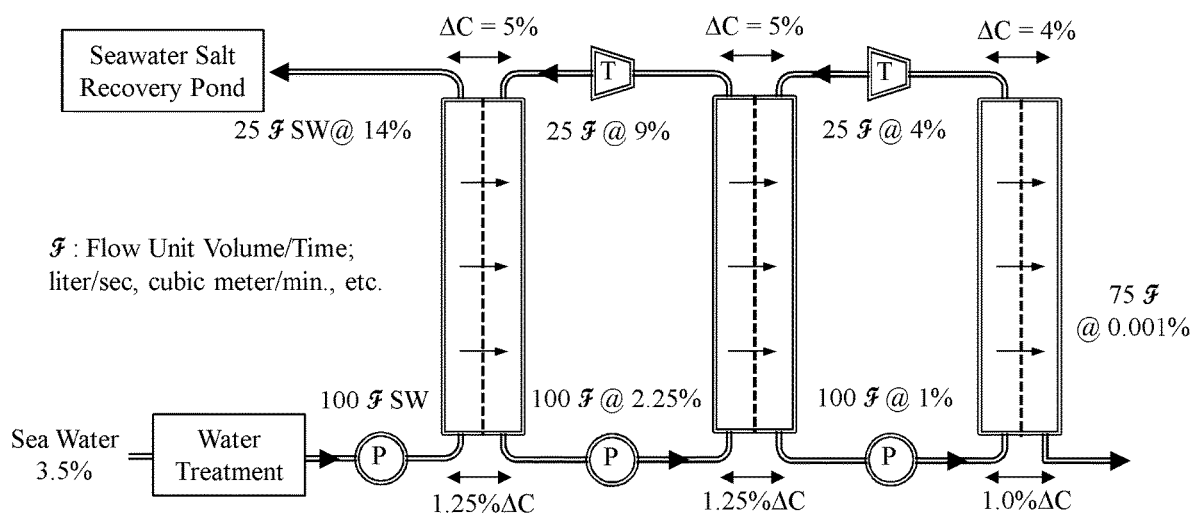
Fig. 27C

SYMBIOTIC REVERSE OSMOSIS FOR MAXIMIZING DESALINATED WATER RECOVERY FROM SALINE WATERS AND BRINES

TECHNICAL FIELD

The present application relates generally to a symbiotic reverse osmosis system using semipermeable flat sheet and hollow fiber membranes panels design.

DESCRIPTION OF THE PRIOR ART

In 1959, two researchers at UCLA, Sidney Loeb and Srinivasa Sourirajan succeeded in producing a functional synthetic RO membrane from cellulose acetate polymer and based on this development, the world's first commercial RO plant was built in Coalinga in 1965. Today, reverse osmosis and membrane filtration elements are used for multitude of water treatment processes and applications and many types of membranes are developed and in use worldwide. However, all of these applications are functionally still limited by seawater salinity of 3.5%

This serious operational limitation has promoted the applicant of this invention to consider rather new approach that allows the use of the technology not only for seawater, but also for brines of different composition, solutes and salinity on a wide range of new applications, by relying mostly on available desalination membranes and conventional operational and control systems.

The need for developing technologies for a) high salinity reverse osmosis and b) high salinity osmotic power generation has promoted the patent applicant to develop new applications in these fields, relaying essentially on currently available semipermeable membranes. Spiral wound and hollow fiber membranes are heavily used today in seawater desalination, but these membranes, due to their relatively low mechanical integrity, their compacted assembly and excessive fouling are unsuitable to meet the stringent performance of the aforementioned two objectives.

Semipermeable Flat Sheet Membranes (FSM) should operate within a salinity that is less than salt saturation point (about 36%) to minimize concentration polarization, as well as maintaining relatively even flow distribution through the flat membrane panels.

In water desalination, sodium chloride is the primary dissolved salt of concern. At 1% sodium chloride solution, osmotic pressure is about 112 psi. Seawater nominal salinity is 3.5% and its osmotic pressure is about 392 psi. However, it varies depending on global location. In the Persian Gulf and the Red Sea salinity is 4.5%+/−. As we attempt to extract salt free-water (~0% salinity) by pumping a quantity of seawater across a polymeric membrane to extract desalinated water, the salinity of this feed of seawater tends to increase gradually, requiring higher and higher pumping pressure to extract more desalinated water. Eventually, this membrane fails causing remixing seawater with desalinated water. Generally, most attainable membrane seawater recovery is in the range of 30-40% and may reach 50%.

At this water recovery ratio, seawater salinity reaches 7%. This implies that the theoretical pumping pressure to reach this target is now 784 psi. Taking into account the efficiency of pumping equipment, loss in pipe and valves, etc., then the required operating pressure may exceed 1000 psi, depending on equipment efficiency. Therefore, reverse osmosis processes, particularly for high salinity are pressure demanding technologies, requiring the use of multi-stage pumps and pressure vessels.

Further, the current commercial semipermeable membrane maximum operating limit is at or about 7% salinity, which prevents any further development of processes that can make advantage of higher salinity domains such as Great Salt Lake, USA of 24%, or the Dead Sea, Israel of 36% and many others sites worldwide.

The inventor envisioned and patented a technology (U.S. Pat. No. 8,545,701) that employs a Symbiotic Salinity Concept (Induced Symbiotic Osmosis [ISO] for Salinity Power Generation), however, there is no polymeric membrane technology in practice today, or anticipated in the future, that is adequate for commercial desalination that can withstanding the pressure required for desalinating or generating osmotic power from 25% brines at 3000 psi.

The Food and Agriculture Organization of the United Nations, FAO has water salinity classification considering surface and underground water: Slightly saline water is 500-1,500 ppm. Moderately saline water is 1,500-7,000 ppm. Highly saline water is 7,000-15,000 ppm. Very highly saline water is 15,000-35,000 ppm. Brine is greater than 45,000 ppm.

For purposes of this application, water salinity of most open seas of the world have salinity of 35,000 (3.5% salt) with most of its salt contents is sodium chloride. Water salinity of natural waters with lower salinity than that of the seawater is considered as brackish water according to the following categories: Mild Brackish water is 1000-5,000 ppm, Moderate brackish water is 5000-15,000 ppm (0.5%-1.5%), Heavy brackish water, 15,000-35,000 ppm (1.5%-3.5%). However many of these water sources may contain many salts other than sodium chlorides, particularly in underground water. The relatively enclosed Red Sea and the Persian Gulf have water salinity is about 4.5%.

Although some strides have been made, considerable shortcomings remain.

BRIEF DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

FIGS. 1A and 1B are illustrations simulating osmotic pressure in biological systems and seawater respectively, according to the present application.

FIGS. 2A and 2B are a series of separate sequential depictions illustrating the concept of osmosis and reverse osmosis of fresh water and seawater respectively.

FIGS. 2C and 2D depict the concept of hypersalinity osmosis and reverse osmosis process in both a freshwater to brine cascade and a brine to freshwater cascade respectively.

FIGS. 3A-3C are side views of vessels illustrating the concept of desalination of seawater according to the present application.

FIG. 4 is a chart of a Log Mean Concentration Difference Estimation for use with the system and process of the present application.

FIGS. 5A and 5B are exemplary depictions illustrating the concept of seawater symbiotic reverse osmosis [SRO] process desalination according to the system and process of the present application.

FIGS. 6A and 6B are exemplary depictions illustrating the concept of 1% brackish water symbiotic reverse osmosis [SRO] process.

FIGS. 7A and 7B are exemplary embodiments of a single cell symbiotic reverse osmosis process with 2% brackish water at a 75% recovery.

FIGS. 8A and 8B are an exemplary embodiment of a twin cell symbiotic reverse osmosis process with 1% brackish water @ 93% recovery.

FIG. 9 is an exemplary embodiment of a Tri-Cell symbiotic reverse osmosis process with 2% brackish water @87.5% recovery.

FIG. 10 is an exemplary embodiment of Seawater desalination with one (1) seawater reverse osmosis process and three (3) symbiotic reverse osmosis process stages operating within the range of 3.5-14% salinity, with potential desalinated water recovery of 75% at a differential salinity concentration of 6% and a potential energy recovery of 25-40% with hydraulic turbines or pressure exchangers.

FIG. 11 is an exemplary embodiment of a Seawater desalination scheme of the embodiment of FIG. 10, with one (1) seawater reverse osmosis process and three (3) symbiotic reverse osmosis process stages operating within the range of 3.5-14% salinity, with potential desalinated water recovery of 75% and up to 40% power requirements reduction by using pressure exchangers.

FIG. 12 is an exemplary embodiment of a Flat Sheet Membrane [FSM] Equipment Arrangement of Seawater Desalination Recovery Of 75% in accordance with the embodiment of FIG. 10.

FIG. 13 is an exemplary embodiment of a Hollow Fiber Membrane [HFM] Equipment Arrangement of Seawater Desalination Recovery of 75% in accordance with the embodiment of FIG. 10.

FIGS. 14A-14B are exemplary membrane designs for use in Hypersalinity processes and applications for exchanging water of different salinity; ISOP and SRO Systems.

FIG. 15 is an exemplary embodiment of a Flat Sheet Membrane [FSM] train layout of just the first 3 cells of a 4 cells train for seawater desalination of 75% recovery as seen in the process of FIG. 11.

FIG. 16 is an exemplary embodiment of an Enlarged vessel drawing of the first stage for seawater desalination as shown in FIG. 15.

FIG. 17 is an exemplary embodiment of a seawater reverse osmosis [SWRO] process & a Multi-Cell symbiotic reverse osmosis process with 3.5% Seawater at 87.5% Recovery.

FIG. 18 is an exemplary embodiment of a Multi-Cell symbiotic reverse osmosis process with 9% brine feed at 67% Recovery.

FIG. 19 is an exemplary embodiment of Typical Multi-Stages Induced Symbiotic Osmosis Power and Symbiotic Reverse Osmosis Exchangers employing Hollow Fiber Membrane Frame [HFM] or Flat Sheet Membrane Frame (FSM), in Gradually Reduced Number or Sizes For Sustaining Flow Reynolds Number of 3000-3,500 For Membrane Fouling Mitigation.

FIG. 20 is an exemplary embodiment of a Multi-Cell symbiotic reverse osmosis Desalination of 7% Brine Feed @75% Recovery At Differential Salinity Concentration of 6%.

FIG. 21 is an exemplary embodiment of Multi-Cell Induced Symbiotic Osmosis Power Generation [ISOP] Brine Train of Four (4) Cells For Electric Power Generation, at Differential Salinity Concentration of 6%.

FIG. 22 is an exemplary embodiment of Process Reversibility of Symbiotic Reverse Osmosis [SRO] and Induced Symbiotic Osmosis Power Generation [ISOP].

FIG. 23 is an exemplary embodiment of Agitated Axial Flat Sheet Membranes (FSM) and a Variable Flow Reverse Osmosis Scheme.

FIG. 24 is a side view of a Single stage vertical well axial flow [FSM] RO.

FIG. 25 shows a side view of a Multi-Stages Desalination Tower & Accessories with an Axial Flow [FSM] RO membrane process.

FIG. 26 is a table of defined design and operating parameters used in the present application.

FIGS. 27A-27B are exemplary depictions illustrating the concept of a multistage symbiotic reverse osmosis desalination train for recovering 75% potable water from seawater (SW) and using rejected brine to recover sea salt.

FIG. 27A illustrates a simulation of SW Single Stage Desalination Rejected Brine/SW Salinity Ratio=2/1.

FIG. 27B illustrates a simulation of SW Two Stages Desalination Rejected Brine/SW Salinity Ratio=3/1.

FIG. 27C illustrates a simulation of SW Three Stages Desalination Rejected Brine/SW Salinity Ratio=4/1.

While the system of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The system and process in accordance with the present application overcomes one or more of the above-discussed problems commonly associated with conventional membrane technology and processes. Specifically, the system of the present application uses semipermeable Flat Sheet Membranes (FSM) intended for new and novel development in Hypersalinity processes and applications and is illustrated and described in FIGS. 1-26. This and other unique features of the system are discussed below and illustrated in the accompanying drawings.

The system and process will be understood, both as to its structure and operation, from the accompanying drawings, taken in conjunction with the accompanying description. Several embodiments of the system are presented herein within FIGS. 1-26. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The inventor of this subject technology believes that osmosis is one leg in the tripod of all forms of life since its inception on earth billions of years ago. This tripod comprises of Photosynthesis, Osmosis, and Production/Motherhood. Without this tripod, life as we know it today could not existed.

The term "salt" is defined for the purpose of this application as a natural mineral origin of relatively low molecular weight and of high degree of solubility in water.

This patent application promotes a methodology for recovering potable water from vast sources of saline water, particularly surface water comprising sodium chloride of various concentrations. Applications range from less than 1% to 20% salinity, with emphasis on the following salinity water application: Brackish water of 0.5%-3.5% salinity, Seawater of 3.5-4.5% salinity and brine water of 5%-20% salinity, with effluent water rejection of up to 30% salinity, which is a viable source for salt recovery or for osmotic power generation.

The Concept of Hypersalinity Osmosis & Reverse Osmosis is seen primarily through FIGS. 1-19 in the drawings. Each Figure is described in detail in the respective illustrations. The Concept of Reversibility of Symbiotic Reverse Osmosis [SRO] and Induced Symbiotic Osmosis Power [ISOP] is seen primarily through FIGS. 20-23. Additional FIGS. 7A-25 are shown as illustrative examples of the system and process of the present application in varied configurations and in varied embodiments. FIG. 26 is a table illustrating defined terms used throughout the application. A review of the Figures in light of the description herein provided is sufficient to convey to a user the concept and breadth of the system and process.

Osmosis is the spontaneous movement of water, through a semipermeable membrane that is permeable to water but impermeable to solute. Water moves from a solution in which ionic solute is of low concentration to a solution in which ionic solute is of higher concentration. Osmosis relies on the Chemical Potential of solution which generates the tendency to transfer particles in a solution. It is the diffusion of water molecules (0.265 nano-meter) through a semipermeable membrane from a solution with low or no solute concentration (high chemical potential; $\mu_1$—having the tendency to give particles) to a solution with a higher solute concentration (low chemical potential; $\mu_2$—having the tendency to accept particles).

This transferring process continues until the water head rises in the high salute concentration equalizes the chemical potential difference between fluids across the membrane, implying that the chemical potentials across the membrane are equalized; wherein $\mu_1 = \mu_2$.

The driving force of the flow movement is the difference in the Chemical Potential on the two sides of the semipermeable membrane. The higher the chemical potential, meaning the higher the ionic gradient, the higher is the osmotic pressure; consequently the higher is the recovered energy potential. Osmotic pressure (OsP) of sodium chloride solution is 112 PSI (7.724 bars, or ~79.1 meters) for every 1% solution (10,000 mg/l). Different salts have different osmotic pressure.

Now with respect to Symbiosis: The term symbiosis although a biological phenomenon, its generic or metaphorical concept refers to a mutual relationship of cyclic reverberation, without altering or modifying any of the specific components of the involved systems.

One of the most pronounced symbiotic examples in nature is the relation between honey bees and flowering plants. Bees seek the nectar of flowers for their food, but in the process, they transfer plants' pollen from one plant to the others, sustaining the species existence. Demise of species demises the survival of its dependents!

In industrial applications, symbiosis is a process whereby a waste or less valuable byproduct in one industry is turned into a resource for use in one or more other industries. In essence, it is the process of optimizing functions of interrelated systems and achieves their ultimate availability. Therefore, an object of the present application is to employ natural phenomena in the design of industrial applications that sustain human existence and other forms of life that are being threatened by manmade global warming. In this regard, the process of using osmosis in an interrelated sequence of semipermeable cells will be referred to as "Induced Symbiotic Osmosis" and is abbreviated here by the acronym "ISO".

Furthermore, the process of a sequence of interrelated osmotic power generation cells will be referred to as "Induced Symbiotic Osmosis Power" abbreviated herein by the acronym "ISOP".

Additionally, the process of using osmosis in an interrelated sequence of reverse osmosis cells to recover 75% or more from seawater and brines will be referred to as "Hypersalinity Symbiotic Reverse Osmosis" and is abbreviated herein by the acronym "SRO".

Referring now to Symbiotic Osmosis Unit Operation, Function and Control. As seen in the Figures, Induced Symbiotic Osmosis Power generation (ISOP) and Symbiotic Reverse osmosis (SRO) trains comprise a series of cells operating in an interrelated sequential pattern within a salinity field that could extend in range from no salinity on one side of the train to a maximum salinity attainable (saturation point) on the other end of the train.

Each cell is configured to act as a contained hydraulic loop, comprising several flat sheet semipermeable membrane panels or thousands of hollow fiber membrane panels. Additionally included is an associated pump, pressure exchanger or power generation turbine, flow control valves, and a set of instrumentation for measuring salinity, temperature, flow, etc. within each cell and preferably an automated brine insertion means to compensate for salt depletion in each loop.

Here, each cell is charged with brine of specified salt quantity and type, operated at progressively increasing concentration and osmotic pressure ratio as in case of osmotic power generation, or operated at progressively decreasing concentration and osmotic pressure ratio as in case of reverse osmosis, where all cells in the series are functioning simultaneously in symbiotic mode.

However, membrane trains operated in natural domains are generally bounded by fresh, brackish or seawater on one side of the train and brine of relatively high salinity on the outlet side of the membrane train. While closed cycle membrane trains are generally operated with a water solution of a single solute, where each cell is charged with specified concentration of the same salt and the train power generation is accomplished by exchanging desalinated water on one side of the train with the concentered solution on the outlet of the train. This implies that the desalinated water that crosses from one side of the membrane to the other side is essentially salt free, at the same flow rate (No accumulation of water or salt within the loops) and is identified in this process as "The Tie Line", which is an important property of multi loop osmotic processes.

Transport within cells is chemically driven under the influence of concentration potential field bounded by water of no or low salt concentration (LC) and by natural or manmade brine of high salt concentration (HC), thermodynamically approaching reversibility between cells, sharing semipermeable membranes between pre and post cells.

Estimation of salt content in each loop is based on the average salinity of the brine inlet and outlet to the immediately preceding loop, as well projected flowrates of inlet and outlet streams to each cell, but specifically relying on the concept of the Log Mean Concentration Difference (LMCD) as seen in FIG. 4. Estimation of LMCD has to be relatively the same within all the cells of the train.

Osmotic Pressure is defined mathematically as: $\pi = \Phi I\, CR\, T$.

The higher the chemical potential of a solution, the higher is its ionic gradient, and the higher is its solution osmotic pressure. Placing a solution with osmotic potential within a semipermeable membrane tube or a sleeve induces water across said membrane, generating water head. To prevent water from spontaneously flowing inward (induced osmosis) across the membrane and nullifies the effect of osmotic pressure of a solution across a semipermeable membrane, a force (force/unit area=pressure) of the same magnitude has to be applied against the solution. If this force exceeds the osmotic pressure of a solution, then the process is reversed and water only flows outward across the semipermeable membrane, which is the well-known mode of reverse osmosis process. Calculation details of Osmotic Pressure ($\pi$) and its application are detailed below in greater detail.

Regarding now the topic of Seawater Osmotic Potential. Seawater is the most abundant saline fluid and has a salt concentration of about 3.5% or an osmotic pressure of about 392 psi (about 27 bars). Maximum solubility of NaCl in water at 25° C. is 3.57% (357 mg/ml) and 3.84% (384 mg/ml) at 100° C., Current commercial seawater reverse osmosis (SWRO) desalination may reach up to 50% recovery of desalinated water but can result in a rejected stream that has 7% salinity with relevant osmotic pressure of 784 psi. Actual desalination operating pressure has to account for pumping and control systems inefficiency that may cause required pumping pressure in excess of 1000 psi.

Most semipermeable polymeric membranes that are adequate for seawater desalination can't sustain operation or maintain separation efficiency at pressure exceeds 1,100 psi and eventfully fail, a condition that may force the system operator to run the desalination process at a lower desalination recovery, i.e., of 40% or less to sustain the life of the membrane.

For this reason, this invention is based on operating a train of cascading conventional membrane modules, where each membrane module is operated within a maximum concentration differential of less than 7% and preferably with concentration differential of 4%-5%, allowing the train to achieve water recovery up to the practical attainable water salinity saturation range of 28-30%.

It is an object of the present application to expand this field of osmosis technology by employing conventional Flat Sheet Membranes in the form of rectangular panels, not only in the broad field of symbiotic harnessing of the potential of aqueous electrolytic solutions by means of osmosis, but also to improve recovery of desalinated water from seawater and brines by at least 75%. Furthermore it is an object to allow new development in power generation, fractionation of gases and recovering chemicals and water in waste streams.

This patent application pertains to the concept of Large Scale osmotic Processes (LSOP) for saline waters and brines desalination, electric power generation, harvesting salts, etc. employing the chemical potential dissimilarity of solutions, with potential integration with solar and wind energies, but without dependence on conventional carbon-based or fission energy.

The osmosis phenomenon is reversible. A reversible process is cyclic and can be reversed by means of infinitesimal changes in some property of the system without loss or dissipation of energy from the system and its surroundings. It is impossible to reach perfect reversibility due to the infinite time required to complete these infinitesimal changes. However, the system undergoing the changes may closely reach reversibility if it responds much faster to the applied change without loss of energy, particularly if it is temperature independent or approaching isothermal conditions, which is generally the case in osmosis application. Therefore, the inventor of this work promotes the concept of an efficient new osmotic energy cycle to be named the "ISO Cycle", also the "Reversible liquid Power Cycle".

As stated previously, Osmotic pressure is defined through the following formula: $\pi = \Phi/CR\, T$.

The first law of thermodynamics rules out the possibility of constructing a machine that can spontaneously create energy. However, it places no restrictions on the possibility of transferring energy from one form into another.

Then, osmotic pressure mathematical general form can be presented as:

$$\Delta\pi = \Delta p = RT\Delta C_s \quad (\text{Eq. 01})$$

The osmotic pressure $\pi$ was originally proposed by Nobel Laureate Van't Hoff and modified to include Staverman's osmotic reflection coefficient to become;

$$\pi = \Phi i_c RT \quad (\text{Eq. 02})$$

Where:
$\pi$=osmotic pressure or force imposed on the membrane given in bars, atm, psi, etc.
$\Phi$=Osmotic Reflection Coefficient (NaCl=0.93, KCl=0.92, CaCl2=0.86, MgCl2=0.89, HCl=0.95, NH4Cl=0.92, NaHCO3=0.96, Na2SO4=0.74 MgSO4=0.58 glucose=1.01.
i=Ions concentration per dissociated solute molecule ($Na^+$ and $Cl^-$ ions=2),
c=molar concentration of the salt ions,
R=gas constant (0.08314472 liter·bar/(k·mol)), T=ambient temperature in absolute Kelvin degrees (20° C.+273°=293° K).

In summary, specifying the number of cells in a multi-cell ISO train is dependent on the following parameters:
1. Train concentration potential field, $\Delta C_{train}$.
2. Salt differential concentration across the membrane, $\Delta C_{S_R}$
3. Cell differential high and low concentration ratio, (HC/LC).
4. Permeate Tie-Line flow, TL, m³/s.
5. Low concentration operating line, LCOL.
6. High concentration operating line, HCOL.
7. Membrane mechanical integrity, MMI.
8. Membrane Log Mean Concentration Difference, LMCD.
9. Feed streams and cells content temperature, in degree absolute K.
10. Changes of heat of solution within each cell.
11. Membrane concentration polarization fouling.

The proposed new osmotic processes relies heavily on the inventor's prior art for recovering energy from hypersaline waters that is titled "Induced Symbiotic Osmosis Process [ISO]". ISO comprises series of cells, each forming a closed hydraulic loop comprising pumping and power generation turbine, sharing semipermeable membranes between pre and post cells. Since most natural osmotic salinity applications relies essentially on sodium chloride, the following two osmotic pressure potential may shed light on the means to design osmosis design systems.

In the case of sea water, the amount of average concentration of oceans salt is about 3.5% (35 gram/liter) mostly in the form of sodium chloride (NaCl). For simplicity of calculation, it is assumed that seawater contains 35 grams NaCl/liter. The atomic weight of sodium is 23 grams, and of chlorine is 35.5 grams, so the molecular weight of NaCl is 58.5 grams. The number of NaCl moles in seawater is 35/58.5=0.598 mol/liter and the osmotic pressure of seawater is:

$$\pi=[0.93][2][0.598 \text{ mol/liter}][0.08314 \text{ liter·bar/}(\text{k·mol})][293 \text{ K}]=27.11 \text{ bar}$$

Since one bar=100,000 Pascal (Pa) and one kilogram (force) per square centimeter ($kg_f/cm^2$)=98066.5 Pascal, computation of osmotic pressure, $\pi$ and energy, $SW_E$, $LW_E$ can be presented in several forms:

$$\pi=[27.1\times10^5 \text{ Pa}]/[98066.5 \text{ Pa}/(kg_f/cm^2)]=27.63 \text{ } kg_f/cm^2$$

$$\pi=[27.63 \text{ } kg_f/cm^2][m/100 \text{ cm}][1000 \text{ cm}^3/\text{liter}]=276.3 \text{ } kg_f \cdot m/\text{liter}$$

$$SW_E=[276.3 \text{ } kg_f \cdot m/\text{liter}][9.80665 \text{ Joule}/kg_f \cdot m]=2711 \text{ Joule/liter}=2.711 \text{ MJ/m}^3 \qquad a.$$

$$SW_E=[2711 \text{ Joule/liter}][1 \text{ cal}/4.184 \text{ J}][1 \text{ kcal}/1000 \text{ cal}]=0.6479 \text{ kcal/liter} \qquad b.$$

$$SW_E=[2711 \text{ Joule/liter}][1000 \text{ liter/m}^3]=2.710 \text{ MJ/m}^3=0.751 \text{ kWh/m}^3 \qquad c.$$

In case of generating power continuously (1 m³ per sec, every second per day), which is the case with power generation systems, the theoretical potential power capacity of this system is:

$$[2.711 \text{ MJ/m}^3][1 \text{ m}^3/\text{s}][3600 \text{ s}]=9.759\times10^9 \text{ J}=[9.759\times10^9 \text{ W·s}][h/3600 \text{ s}]=2.711 \text{ kWh} \qquad d.$$

$$SW_E=[2,711 \text{ kWh}][24 \text{ hrs/day}][365 \text{ days/year}]=23.75\times10^6 \text{ kWh annually}. \qquad e.$$

In the case of hyper saline lake such as the Great Salt Lake, the amount of average salt concentration is about 24% (240 gram/liter) mostly in the form of sodium chloride (NaCl). Lake water osmotic pressure is calculated as:

$$\pi=[0.93][2][4.1026 \text{ mol/liter}][0.08314 \text{ liter·bar/}(\text{k·mol})]\cdot[293 \text{ K}]=185.88 \text{bar}$$

For continuous power generation at a rate of 1 m³ per sec, the theoretical potential power capacity of the lake water (LW) of such system where; 1 W=J/s, 1 W·s=J, 1 kWh=3.6× 10⁶ J, then:

$$LW_E=[18.2286 \text{ MJ/m}^3][1 \text{ m}^3/\text{s}][3600 \text{ s}]=[65.623\times10^9 \text{ J}][1 \text{ kWh}/3.6\times10^6 \text{ J}]=18,228.6 \text{ kWh}$$

$$LW_E=[18,228.6 \text{ kWh}][24 \text{ hrs/day}][365 \text{ days/year}]=159.682\times10^6 \text{ kWh/year}.$$

Specific gravity, SG is estimated at 20° C., using the inventor's simplified following relation:

$$[SG=1+0.0077\times C\%], \text{ where } C \text{ is salt concentration in the form of sodium chloride, since saline waters contain mostly this salt.}$$

Turbine Energy (MJ)=$(\eta)(\rho)(g)(h)(Q)$, where $\eta$: turbine efficiency (<1.0), $\rho$: density (kg/m³), g: acceleration of gravity (9.81 m/s²), h: water column height, head (m), Q: water or brine flow (m³/s), MJ: Mega Joule, Watt=Joule (J)/second.

Another simplified estimation is based on concentration, where turbine generated power equals [(0.658 MJ per 1% of concentration) (C %) (SG) (Q)], based on turbine hydraulic efficiency of 85% and where C, SG and Q are flow conditions at the turbine inlet.

Similarly, pumping requirement can be also based on concentration, where pump shaft energy equals [(1.033 MJ per 1% of concentration) (C %) (SG) (Q)], based on pump efficiency of 75% and where SG and Q are flow conditions at the outlet of the pump, but C is the concentration % at the inlet of the turbine, where pumping is intended to overcome the osmotic pressure leaving the membrane.

Considering as an example power generation from the Great Salt Lake of Utah, USA. In summary: an ISO train comprises three (3) cells operating at constant cell (HC/LC) ratio of 4.0, employing 1 m³/s from Gunnison Bay with salinity of 24% salt is exchanged with 3 m³/s with negligible salinity from Bear River water, operating at equal Log Mean concentration difference (LMCD) of 4.43 across membranes would generate a net energy of about 17,000 kWh.

Here, each cell is charged with brine of specified salt quantity and type, operated at progressively increasing concentration and osmotic pressure ratio, all cells in the series function simultaneously in symbiotic mode. Transport within cells is chemically driven under the influence of concentration potential field bounded by water of low salt concentration (LC) on one side of a semipermeable membrane and by natural or manmade brine of high salt concentration (HC) on the other side of said membrane, thermodynamically approaching reversibility between cells.

This invention is rooted in the field of physics and pertains to the development of a chemical engineering conceptual process design, presenting new vision in the energy field. The inventor believes that understanding the basic physics and thermodynamics pertain to solutions and osmosis and their industrial application in this alternative green energy field have comprehensive value in appreciating this proposed technology.

Specifically, the invention introduces a unique process concept employing series of fluidic cells operating in symbiotic fashion, where each process is formed of closed hydraulic loops operating within a concentration potential field for the following objectives, a) symbiotic osmosis power generation, b) maximizing seawater desalination recovery to 75% or higher, c) reverse osmosis of hypersaline water and brines, d) heatless solutes recovery by means of chemical potential dissimilarity of solutions and e) recovering water and chemicals from hydraulic fracturing of wastewater brines for reuse.

Generally, membranes that are used for pressure-driven separation processes are categorized on the basis of pore diameter. As an example; reverse osmosis (RO) is <1 nm (nanometer), Nanofiltration (NF) is 0.7-2 nm, dialysis 2-5 nm, ultrafiltration (UF) is 2-100 nm, and microfiltration (MF) is 100 nm to 2 nm). Nanofiltration (NF) pore sizes lies between those of RO and UF membranes.

Polymeric membrane pore size is sensitive to the changes of the temperature of fluid feed (brines, various solutions, water or gases, etc.), causing changing in the intended flow rate permeation, particles retention and the intended osmotic driving potential. This is important design parameter that needs to be carefully considered, particularly if the operational train comprises multiple arrays of different membrane panel specification; UF, NF or RO membrane or water solutions of multiple solutes, as it might be the case of the subject invention.

Semipermeable membranes are effective and economical process for water purification or desalination by osmosis. However, current semipermeable membranes technologies, particularly for seawater (3.5% salinity) reverse osmosis desalination are limited to two types of commercial designs; spiral wound membrane and hollow fiber membrane (cellulose acetate of about 1 mm OD), where the later type membrane is monopolized by only one Japanese company and the fiber is not available for sale.

Further, lack of versatility in the assembly of currently marketed desalination membranes, particularly in regard to membrane sheets mounting panels and frames has promoted the applicant of this invention to consider more appropriate design with stringent clearance requirements that allow for high efficiency, yet proper membrane maintenance and efficient operation.

The proposed new membrane frame is intended to hold the flat sheet membranes that are currently being used in reverse osmosis spiral wound membranes. However, these flat sheet membranes have to be structured, assembled and operated to be easily maintained as rectangular frames of multi-panels or leaves to meet the inventor's vision for further development of several new novel applications for relevant fractionation and osmotic processes. This new membrane technology development is currently patent pending (U.S. application Ser. No. 14/967,295) by the inventor since December 2015.

As stated previously,

The term "Symbiosis" although it is a biological phenomenon, its generic or metaphorical concept refers to a mutually relationship of cyclic reverberation, without altering or modifying any of the specific components of the involved systems. In industrial applications, symbiosis is a process whereby a waste or less valuable byproduct in one industry is turned into a resource for use in one or more other industries. In essence, Symbiosis is the process of optimizing functions of interrelated systems and achieves their ultimate availability.

Therefore, the inventor is naming the process of using osmosis in interrelated sequence of power generation cells as "Induced Symbiotic Osmosis" and is abbreviated here by the acronym "ISO". In these proposed technology, each power generation cell forms a fluid loop comprises of pumping and hydraulic power recovery means, while sharing fluid with adjacent loops via semipermeable membranes, operating within salinity concentration potential field, in an ascending pattern in case of Hypersalinity power generation, or descending pattern in case of Hypersalinity reverse osmosis.

Similarly, the inventor is naming the process of using Hypersalinity osmosis in interrelated sequence of reverse osmosis cells, the subject of this patent application, as "Hypersalinity Symbiotic Reverse Osmosis" and is abbreviated here by the acronym "SRO".

As a simplified example that illustrates this phenomenon (FIG. 4); currently seawater system maximum attainable limit for desalination requires one RO membrane module to desalinate seawater of 3.5% concentration, producing about 50% salt-free (~0.0%) water and about 7% rejected brine at an osmotic pressure of 764 psi (about 1000 psi operating pressure). The proposed new technology allows water recovery of 67% or higher instead of 50%, with a system comprises two membrane loops instead of one, while operating at osmotic pressure of 588 psi instead of 784 psi and 10.5% rejected brine. This scheme of operation requires more parts, yet achieves 25% lower osmotic pressure, less expensive and longer life membranes, better power efficiency and higher desalinated water recovery.

In case of water reverse osmosis desalination, the membrane elements are subjected externally to pressurized untreated water at a pumping pressure that is higher than its osmotic pressure, as in case of reverse osmosis, where treated water is flowed across the flat sheet membrane (or into the hollow fiber lumen if hollow fiber is used) and collected in the frame headers and transported to storage for future use, while the rejected saline water outside the membrane is disposed.

In case of osmotic power generation, the membrane elements are subjected externally to saline water operating at a pumping pressure that it is relatively lower than its osmotic pressure, which enhance treated low or no salinity water flowing in the frame headers (or out of the hollow fiber lumen if hollow fiber is used) to be induced spontaneously across the flat semipermeable membrane into the saline water, where the combined flows of both the saline water and the permeated induced water, being at the initial saline water pumping pressure, is circulated through a turbine to generate power that exceeds the power that is consumed to pump the saline water. The same cycle is repeated in the subsequent cells.

The driving force of the flow movement is the difference in the chemical potential on the two sides of the semipermeable membrane, with the solvent (water) moving from a region of higher potential (generally a lower solute concentration) to the region of lower potential (generally higher solute concentration).

"Chemical Potential" appears to be an ambiguous and elusive terminology. In fact, it is one of the most important partial molar quantities. It is the energy potential associated with the activity of the ions of an ionizable substance. It is equal to the rate of change of system's free energy, known as "Gibbs Free Energy", of a system containing a number of moles of such substance, when all other system parameters; temperature, pressure and other components are held constant. Simply, chemical potential is a form of energy like other kinds of potential; electrical, gravitational, momentum, magnetic, surface tension, etc. where, it is spontaneous and in the direction from high to low.

The difference in chemical potential of a substance in two adjacent phases separated by a semipermeable membrane determines the direction in which the substance diffuses spontaneously. When the components of a mixture have the same chemical potential no chemical transport or reaction takes place, and no mutual diffusion will occur, because there is no driving force. The chemical potential is an intensive property of a substance in a phase.

Concentration polarization results of accumulation of dissolved salt at the membrane suffice, creating relatively high localized osmotic gradient, reducing osmotically driven normal permeate diffusion and hinders membrane flux. In general, membranes operating in induced osmosis mode are less susceptible to this phenomenon due to the low pressure imposed on membrane as compared with membranes in reverse osmosis service.

Log Mean Concentration Difference, LMCD, as given in FIG. 4, is a critical design parameter in evaluating system efficiency and its impact on the overall capital cost of the system.

Regarding Induced Symbiotic Osmosis [ISO] membrane flux, the simplest equation describing the relationship between osmotic, hydraulic pressures and water flux, $J_w$ in this invention is based on calculating the log mean concentration difference, LMCD as one of the important criteria for realistic determination of equipment size and the cost of power generation process.

LMCD has been calculated for all design cases since it is one of system efficiency parameters, particularly when energy regeneration efficiency is debatable.

$$J_w = AKp[\Phi\Delta\pi @ \Delta C_{lm} - \Delta P] \quad \text{(Eq. 16)}$$

Where $J_w$ is water flux, Kp is the hydraulic permeability of the membrane, A is membrane area, $\Delta\pi$ is the difference in osmotic pressures on the two sides of the membrane, $\Delta P$ is the difference in hydrostatic pressure where negative values of $J_w$ indicating reverse osmotic flow. $\Phi$, reflective coefficient, $\Delta C_{lm}$ is log mean concentration difference (LMCD), calculated as shown in FIG. 4.

In this scenario each of the closed loop cells should be provided by means to charge these cells with suitable brine for its function or to evacuate it, providing adequate surging capacity for each cell and means to control the flow as a function of its concentration. In this patent application, simple systems with few components are discussed, but in a large scale ISO plant with many ISO trains comprising hundreds of membrane elements and potentially millions of square meters of semipermeable membranes an elaborate operating system would be required.

Desalinated water permeates semipermeable membranes under the influence of osmosis, without accumulation or depletion of cells' water and salt content. In essence, water migrates from one ISO cell to another, in symbiotic fashion at a constant flow, defined in this application as the "Tie-Line" flow. Permeate flow is technically referred to as membrane flux. Flux rate per unit area of membrane is dependent on the hydraulic permeability of the ISO membrane, as well as membrane logarithmic mean concentration difference, LMCD. These two parameters are of great importance that should be maximized, when possible, for favorable economic justification of ISO salinity power generation.

Regarding the title of this invention, the inventor believes that osmosis is nature's gift to life. It is the vehicle to transport fluids in all living cells and without it, all biological functions and all forms of life ceases to exist! This phenomenon is attracting the attention of researchers as a means to generate power. They tend to describe it in industrial terms such as forward osmosis, ordinary osmosis, direct osmosis, pressure retarded osmosis, etc.

In order to harness this natural phenomenon, the inventor believes that relevant potential fields should be established to induce and bring about the wonders of this phenomenon. Therefore, the inventor prefers to describe all applications that utilize the power of osmosis for the benefit of mankind as "Induced Osmosis".

The current application has many advantages over the prior art including at least the following: (1) desalinate the salt water intake in very short time with minimum use of expensive land and generates desalinated water to supply the city; (2) provide a continuous automated cycle without contamination, avoiding environmental complications and the permitting process, minimum labor, very efficiently and clean operation and product; (3) use brine to generate electrical power by exchanging some of the brine with seawater through one or more cells; (4) Economically recover the salt employing low energy demand evaporation/crystallization for human consumption and other commercial applications instead of the currently used massive size seawater open domain salt ponds (slaterns or salt pans) evaporators; (5) The desalinate recovery can be more than 85% of seawater, without exceeding the allowable operating pressure of its membranes; (6) cascading flat sheet or hollow fiber membrane train; and (7) operating a multistage train of cascading conventional membrane modules.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

The invention claimed is:

1. A method for a symbiotic reverse osmosis, said method comprising the steps of:
   providing a reverse osmosis train comprising a plurality of cells including an initial end cell being a reverse osmosis cell, one or more intermediate cells, and an opposed end cell being symbiotic reverse osmosis cell, each of the cells in said plurality of cells forming a hydraulic loop configured of specified volumetric capacity and flow rate for a specified permeate flux, each of the cells in said plurality of cells having a pumping system and a power recovery system being a hydro-power generation turbine system or pressure exchanging means for optimizing power consumption as well as flow and salinity measurements and control, pressure and temperature measurements means, and automated backflush, wherein adjacent cells in said plurality of cells share an enclosed panel of one or more semipermeable membranes, where said membranes are of a hollow fiber or flat sheet membrane configuration, simultaneously functioning in a symbiotic pattern;
   charging each of said cells in said train with a formulated brine having a specified ionizable inorganic salt concentration and type, without permitting mixing of said formulated brine among the adjacent cells in said plurality of cells;

creating a gradient of salt concentration and resulting in osmotic potential that progressively decreases stepwise from said initial end cell, then across said intermediate cells, to said opposed end cell;

feeding the initial end cell membrane of said train with brackish, seawater or brine comprising relatively high salt concentration water;

generating a concentration field across said plurality of cells comprising a progressively decreasing concentration and osmotic pressure ratio throughout said train, bounded by saline water of high salt concentration at said initial end cell and by a low or no salt concentration at said opposed end cell, thereby producing a power train cycle comprising a controlled concentration-pressure loop wherein the concentration field comprising:

(a) osmotically induces a continuous and constant flow rate of substantially salt-free permeate flux throughout said train;

(b) maintains a salt concentration difference across said semipermeable membranes shared by said adjacent cells in said plurality of cells;

(c) defines a salt concentration ratio within each of the cells that ensures a net positive power generation; and (d) discharges desalinated water at said opposing end cell; and (e) operating said reverse osmosis train under conditions effective to recover a continuous and essentially salt free flow of desalinated water.

2. The method of claim 1 further comprising the step of operating said membranes within a maximum concentration differential of less than 7%, allowing said reverse osmosis train to achieve water recovery exceeding 85% with concentrated rejected brine of 28%-30% salt content, wherein the salt content is recoverable by evaporation or crystallization.

3. The method of claim 1, wherein the brine in said intermediate cells, and said opposed end cell of said train is formulated from sodium chloride, without any trace of insoluble material.

4. The method of claim 3, wherein the sodium chloride is derived from seawater, and the insoluble material is selected from the group consisting of calcium carbonate, and barium sulfate salts.

5. The method of claim 1 further comprising the step of creating a Tie Line being a permeated flow across said adjacent cells that is constant throughout said adjacent cells, determining said Tie Line by a volumetric difference between a saline water flow entering said initial end cell and a concentrated saline water rejected from said initial end cell.

6. The method of claim 1 further comprising the step of calculating a water differential salinity by adopting use of a log mean concentration difference.

7. The method of claim 1, wherein said hydraulic loop of each of the cells is filled with saline solution of specific concentration and osmotic pressure, each said hydraulic loop of each of the cells having said pumping system and said power recovery system.

8. The method of claim 7 further comprising the steps of:
circulating the saline solution from said power recovery system to said pumping system to facilitate inducement of substantially salt-free permeate water from a preceding cell; and circulating the saline solution from said pumping system, back to said power recovery system relatively diluted low concentration brine at relatively high pressure to facilitate forcing desalinated water through an adjacent following cell.

9. The method of claim 8 further comprising the step of continuous and simultaneously engaging said membranes in a pre-membrane panels and a post-membrane panels in said train, where each of said cells receives the saline water forcedly by said pumping system in said pre-membrane panels, and forcedly and continually deliver the saline water at a same rate as received, by said pumping system, to said post-membrane panels.

10. The method of claim 1, wherein said brine comprises hydrates inhibitor, biological growth control and scale formation control.

11. The method of claim 1, wherein said specified ionizable inorganic salt type is selected from the group consisting of sodium chloride, sodium iodide, lithium chloride, and potassium iodide.

12. The method of claim 1 further comprising the step of inserting brine into said hydraulic loop of each of the cells for compensating salt depletion in each said hydraulic loop, using an automated brine insertion device based on at least one salinity measurement in each said cell.

13. The method of claim 1 further comprising the step of maintaining the permeate flux between said membrane panels at a prescribed Reynolds number between 3,000 and 3,500.

14. The method of claim 1 further comprising the step of configuring said cells to accept a progressively increasing or decreasing concentration of brine and osmotic pressure ratio.

15. The method of claim 1 further comprising the step of configuring said membrane panels to insure a uniform flow pattern and pressure drop between membrane modules, wherein said membrane modules includes the automated back-flush.

16. The method of claim 1 further comprising the step of backflushing said initial end cell comprising the steps of:
isolating said train for a period of time;
exposing said initial end cell to high salinity brine; and
introducing salt free water on an opposite side of said initial end cell through said adjacent intermediate cell to promote a symbiotic osmosis water flow movement from said initial end cell across through said membrane of said initial end cell to dislodge particles that foul said membrane.

17. The method of claim 1, wherein said train of said cells is configured as self-supported vertical vessels or towers with said membrane panels being vertically stacked.

* * * * *